United States Patent
Kagami et al.

[11] Patent Number: 5,889,669
[45] Date of Patent: Mar. 30, 1999

[54] PROGRAMMABLE CONTROLLER ALLOWING AN EXTERNAL PERIPHERAL DEVICE TO MONITOR AN INTERNAL OPERATION STATE OF A CPU UNIT

[75] Inventors: Hiroyuki Kagami; Kumiko Funahashi; Kouichi Itou; Eijiro Nakajima; Takashi Nonoyama; Motohiro Kaga; Tatsumi Yabusaki; Hideaki Morita, all of Aichi, Japan

[73] Assignee: Mitsubishi Denki Kabushiki Kaisha, Tokyo, Japan

[21] Appl. No.: 541,427

[22] Filed: Oct. 10, 1995

[30] Foreign Application Priority Data

Oct. 24, 1994 [JP] Japan ...................... 6-258056

[51] Int. Cl.⁶ .................................. G05B 11/01
[52] U.S. Cl. .................. 364/146; 364/136; 364/140.01; 364/141; 364/191
[58] Field of Search .................. 364/140, 141, 364/146, 900, 136, 140.1, 192, 191, 186; 395/725, 183.06, 183.07, 183.03; 371/22.5, 22.6, 24, 25.1, 26, 27.1

[56] References Cited

FOREIGN PATENT DOCUMENTS 3-244003  10/1991  Japan.
4-151702   5/1992  Japan.
5-189277   7/1993  Japan.

*Primary Examiner*—Reba I. Elmore
*Assistant Examiner*—Ramesh Patel
*Attorney, Agent, or Firm*—Sughrue, Mion, Zinn, Macpeak & Seas, PLLC

[57] ABSTRACT

A system ROM stores a control program for measuring an internal operation state of a CPU unit, and a data RAM stores a measured internal operation state of the CPU unit. The internal operation measuring control program enables the internal operation state of the CPU unit to be measured in response to a monitor processing request from an external peripheral device, and a measurement result to be sent to the external peripheral device, to thereby allow the external peripheral device to monitor the internal operation state of the CPU unit.

18 Claims, 28 Drawing Sheets

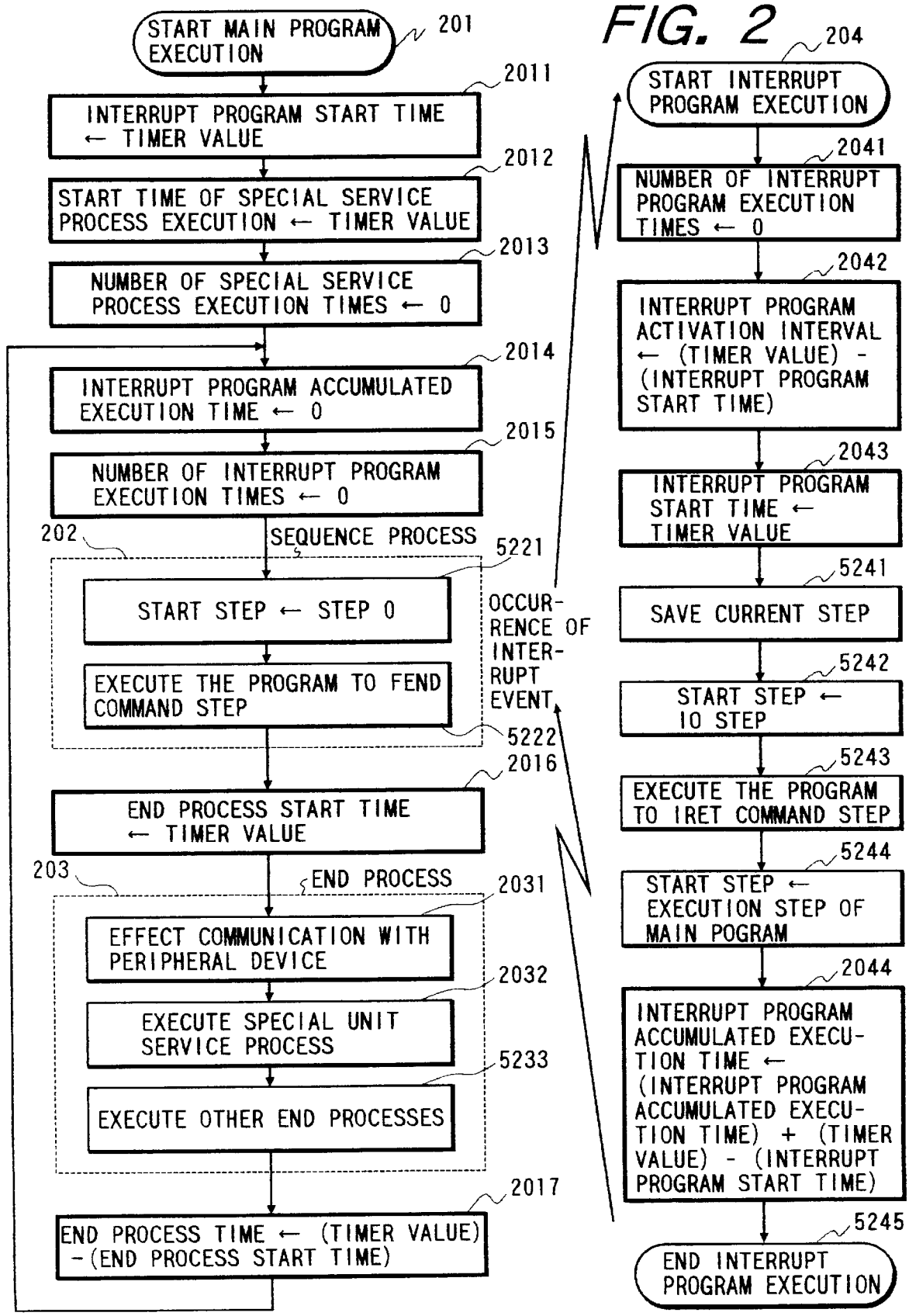

FIG. 5

DATA RAM (13A)

| | |
|---|---|
| 501 | DEVICE CODES (5011) |
| | MEASUREMENT CONDITIONS (5012) |
| | DEVICE INTERVAL MEASUREMENT FLAG (5013) |
| | START TIME (5014) |
| | INTERVAL TIME (5015) |
| 502 | START STEP (5021) |
| | END STEP (5022) |
| | DESIGNATED SECTION MEASUREMENT FLAG (5023) |
| | START TIME (5024) |
| | DESIGNATED SECTION PROCESS TIME (5025) |
| 503 | INTERRUPT PROGRAM START TIME (5031) |
| | INTERRUPT PROGRAM ACCUMULATED EXECUTION TIME (5032) |
| 504 | END PROCESS START TIME (5041) |
| | END PROCESS TIME (5042) |
| 505 | START TIME OF SPECIAL UNIT SERVICE PROCESS (5051) |
| | SPECIAL UNIT SERVICE PROCESS TIME (5052) |
| 506 | NUMBER OF TIMES OF INTERRUPT PROGRAM EXECUTION |
| 507 | NUMBER OF TIMES OF SPCIAL UNIT SERVICE PROCESS EXECUTION |
| 508 | INTERRUPT PROGRAM ACTIVAITON INTERVAL |
| 509 | SPECIAL UNIT SERVICE PROCESS EXECUTION INTERVAL |

FIG. 6

| DEVICE | DEVICE CODE |
|---|---|
| X0~X999 | 0~999 |
| Y0~Y999 | 1000~1999 |
| ⋮ | ⋮ |

FIG. 7

| MEASUREMENT CONDITION | MEASUREMENT CONDITION CODE |
|---|---|
| ON | 1 |
| OFF | 0 |

FIG. 8

0: NOT YET MEASURED ⎯ 801

1: MEASUREMENT STARTED ⎯ 802

3: MEASUREMENT COMPLETED ⎯ 803

FIG. 16

```
[DEVICE INTERVAL]
[MEASUREMENT   ]

DEVICE= [X0]
MEASUREMENT
CONDITION    = [ON]
_____

MEASUREMENT
RESULT      =30msec         ~1601
```

FIG. 17

```
   0:  LD    X0
   1:  OUT   Y0
   2:  LD    X1
   3:  MOV   D0
   4:        D1
   5:  LD    X2
   ⋮    ⋮     ⋮
 100:  LD    X10
 101:  MOV   D10
 102:        D11
   ⋮    ⋮     ⋮
 149:  LD    X20
 150:  OUT   Y20
 151:  LD    X21
   ⋮    ⋮     ⋮
1000:  FEND
```
  ⎵     ⎵
 1701   1702

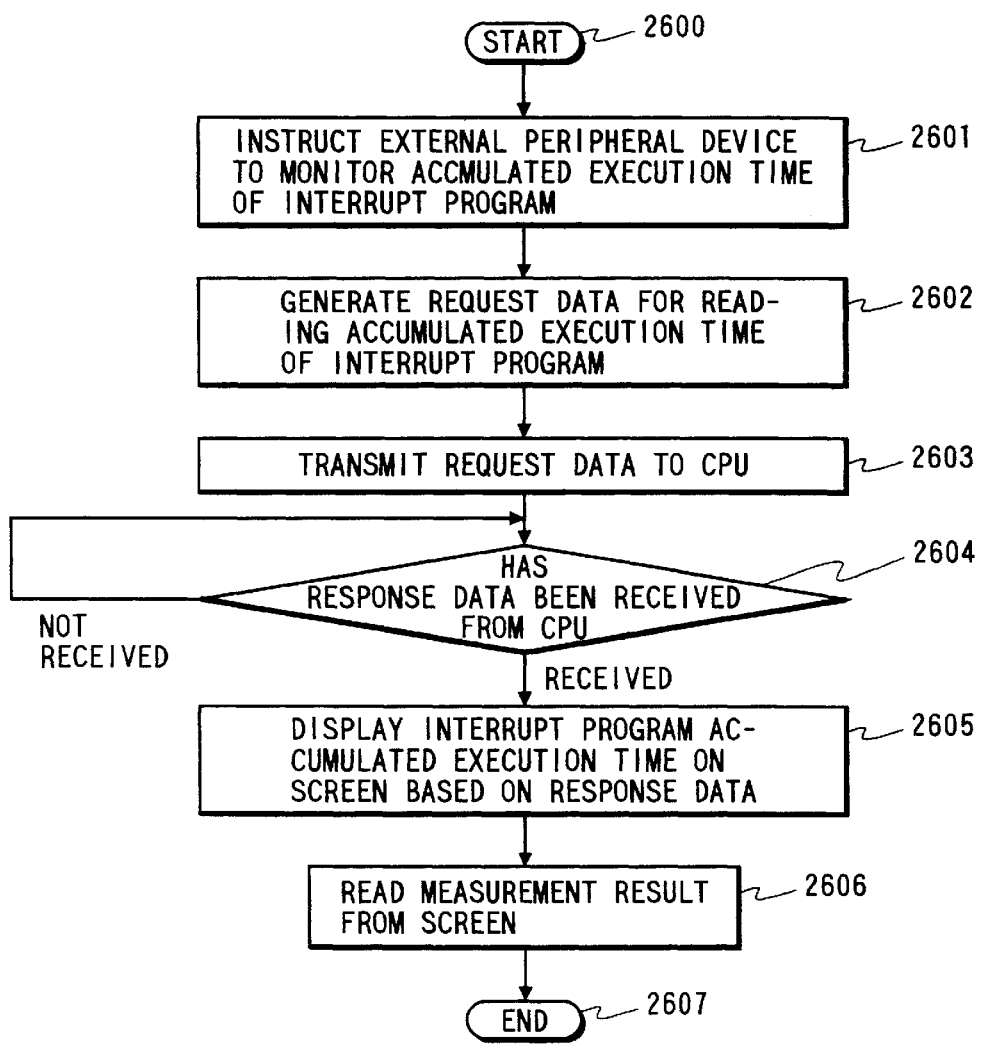
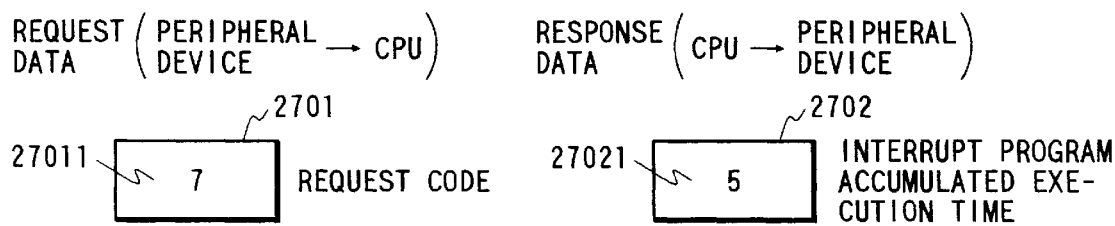

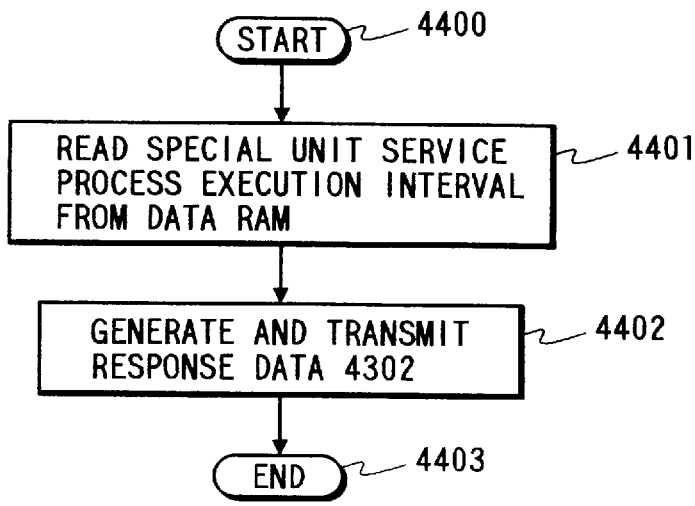
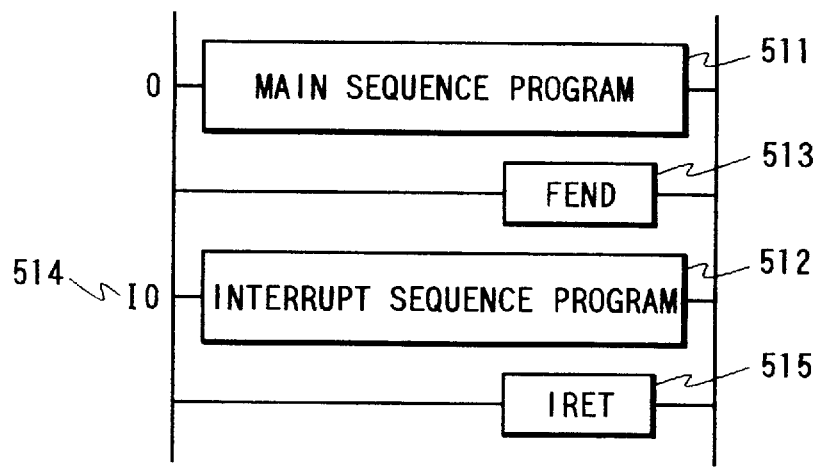

531: SEQUENCE PROCESS TIME
532: END PROCESS TIME
533: INTERRUPT PROCESS TIME
534: COMMUNICATION PROCESS TIME WITH PERIPHERAL DEVICE
535: SPECIAL UNIT SERVICE PROCESS TIME
536: OTHER END PROCESS TIME

PROGRAMMABLE CONTROLLER ALLOWING AN EXTERNAL PERIPHERAL DEVICE TO MONITOR AN INTERNAL OPERATION STATE OF A CPU UNIT

BACKGROUND OF THE INVENTION

1. Field of the Invention

The present invention relates to a programmable controller used in industrial apparatuses, in which operation conditions of a CPU unit are monitored by an external peripheral device.

2. Description of the Related Art

Conventionally, sequence control apparatuses are widely utilized as control apparatuses for industrial apparatuses. It should be understood that a sequence control apparatus corresponds to a control apparatus capable of sequentially performing control operations for industrial apparatuses at respective stages in accordance with a predetermined sequence in such a manner that the completion of one control operation is confirmed, and then the subsequent control operation is selected based upon the result of this control operation.

In the current sequence control apparatus, programmable controllers capable of changing programs (will be referred to as a "PC" hereinafter) constitute major controllers, and the contents of controlling operations are highly advanced. In recent years, while the external peripheral units are connected to PC, the ON/OFF conditions of the input/output signals in the external units controlled by PC, and also such information as numerical data stored within the CPU units can be monitored in real time on the CRT screens of the external peripheral units, for instance, personal computer and the like.

In the conventional PC, the major function is to monitor whether the input/output signal of the external unit under control is ON or OFF. However, in order to recognize the ON-time of the input/output signals which is required when the sequence program is debugged by the programmer, and the internal operating conditions such as the acquisition timings of the input/output signals, the user adds the debugging sequence program to the original sequence program, and activates this debugging sequence program so as to substitute the ON-time and internal operating conditions for the numerical data stored within the CPU unit. Then, these substituted numerical data may be monitored by the external peripheral unit, or may be measured by externally connecting a measuring apparatus such as a logic analyzer.

FIG. 45 is a schematic diagram showing the structure of this sort of conventional PC. In FIG. 45, reference numeral 1 indicates a PC unit functioning as a control center of this programmable controller, reference numeral 2 shows an external peripheral device for displaying a monitored result, and reference numeral 3 represents an input/output unit for fetching an input signal and also for supplying an output signal to external units under control such as a limit switch 4a, a lamp 4b, a valve controller 4c, and the like. Reference numeral 5 denotes a special function unit corresponding to a unit with a function for communicating with a computer 6 and the like.

Reference numerals 10 to 19 and 21 show various units provided within the CPU unit 1. Reference numeral 10 is a CPU (central processing unit) for executing a system program stored in a system ROM 12, reference numeral 11 indicates a sequence program memory for storing a sequence program, and reference numeral 13 represents a data RAM for temporarily storing data under execution of the CPU 10. Reference numeral 14 denotes a peripheral I/F (interface) used to communicate with the external peripheral unit 2, reference numeral 15 is an input/output port for transmitting/receiving a signal with the input/output unit 3, reference numeral 16 shows a device memory for storing conditions of the input/output signals used in the sequence program, and also the numeral data such as the present value of the timer, and reference numeral 17 indicates an interrupt producing circuit for producing a portion of the input/output signals as an interrupt signal. Reference numeral 18 represents an address comparing circuit for continuously monitoring the sequence program memory 11, and for issuing an interrupt to the CPU 10 when a preset address is made coincident with the designated address. Reference numeral 19 denotes a data comparing circuit for continuously monitoring the device memory 16, and for issuing an interrupt to the CPU 10 when a content of a preset address is made coincident with the designated data. The circuit configuration of the data comparing circuit 19 is identical to those disclosed in Japanese Unexamined Patent Publication Nos. Hei. 3-244003 and Hei. 4-151702. Reference numeral 21 denotes an internal timer that continues to measure time asynchronously with the operation of the CPU 10. Numeral 20 denotes a logic analyzer functioning as a measuring unit for monitoring an output signal during the debugging process of the sequence program to observe operating conditions of PC. The special function unit 5, the sequence program memory 11, the system RAM 12, the data RAM 13, the peripheral I/F 14, the input/output port 15, the device memory 16, the interrupt producing circuit 17, the address comparing circuit 18, and the data comparing circuit 19 are connected to the CPU 10 via various types of signal lines 10a such as an address signal line and a data signal line. The CPU 10 reads/writes the data with respect to the sequence program memory 11 and the like via the various sorts of signal lines 10a.

Next, a structure of the sequence program stored in the sequence program memory 11 shown in FIG. 45 will now be described, which is represented in FIG. 46. In FIG. 46, reference numeral 511 shows a main sequence program portion continuously executed, and reference numeral 512 indicates an interrupt sequence program executed only when an interrupt is issued from the interrupt producing circuit 17. Reference numeral 513 shows an FEND command indicative of completion of the main sequence program 511, reference numeral 514 shows an interrupt pointer indicative of commencement of the interrupt sequence program 512, and reference numeral 515 denotes an IRET command representative of completion of the interrupt program. Further, reference numerals 521 to 524 shown in FIG. 47 are instructions stated in the main sequence program 511 and the interrupt sequence program 512, by which the conditions of the external apparatuses of FIG. 45 to be controlled are read, or changed. In accordance with these instructions 521 to 524, the external apparatuses to be controlled are represented by the devices. For instance, a symbol "XO" of FIG. 49 (discussed later) contained in the instruction 521 implies an input signal derived from the external apparatus under the devices are, for example a bit device for storing ON/OFF conditions such as the input/output signals, a word device for storing numerical data, and a timer device. These conditions are stored in the device memory 16 of FIG. 45.

To execute the sequence program shown in FIG. 46, an example of the general execution process of the CPU unit 1 indicated in FIG. 45 is shown in FIG. 47 and will now be described. In FIG. 47, the CPU unit 1 first commences to execute the main program at a step 521. Then, the process operation is advanced to a step 522 at which a sequence process for executing the sequence control is performed. At a step 5221, the starting step of the sequence program is set to the head step, i.e., 0-step of the main sequence program based on the predetermined sequence program. At the next step 5222, the programs defined from the 0-step, namely starting step to the FEND command step are executed. When the FEND command is executed, the process operation is advanced to an END process step 523. At this step 523, a communication process step 5231 with the external peripheral unit 2, a special unit service process step 5232, and other END process step 5233 such as either input process, or output process of the input/output signals in accordance with the value stored in the device memory 16, are performed. When a series of END process step 523 is accomplished, the process operation is returned to the first step 522 at which the CPU unit 1 of FIG. 45 repeatedly performs the above-described process. As described above, it should be noted that the CPU unit 1 repeatedly executes the process operations defined at the steps 522 and 523, and a single process operation is referred to a "scan" in the specification.

The flow operation defined at the step 524 and the subsequent steps represents a flow operation to execute the interrupt program. This interrupt program is executed when the interrupt signal is inputted from the interrupt producing circuit 17 into the CPU 10 during the above-described repeating execution. When the interrupt program is commenced at the step 524, the execution step on the side of the main program presently executed at a step 5241 is saved. Next, at a step 5242, the starting step is set to the head step, namely a step of I0 of the interrupt program. After the process operation has been performed up to the IRET command at a step 5243, the execution step of the main program is set to accomplish the execution of the interrupt program at a step 5244. The process operation is returned from the end step 5245 to the original main program. As described above, the CPU unit of FIG. 45 repeatedly performs the process operations of the normal main program defined at the steps 522 and 523, as represented in FIG. 47, and executes the interrupt program of the step 524 every time the interrupt process request is issued, and thereafter the process operation is returned to the main program.

Referring now to FIG. 47, a time chart for the process operations, indicated in FIG. 47, by the CPU unit 1 of FIG. 45 will be explained. In FIG. 48, reference numeral 531 indicates sequence process time required in the sequence process 522 shown in FIG. 47, which contains interrupt process 533 of the interrupt process 524 indicated in FIG. 47. Reference numeral 532 indicates END process time required in the END process 523 shown in FIG. 47. This END process time 532 is defined by combining communication process time 534 of the communication process 5231 with the external peripheral device 2 of FIG. 47, service process time 535 of the service process 5232 of the special function unit 5, and END process time 536 other than another END process 5233. It should be noted that time required for one scanning operation, namely communication between the sequence process time 531 and the END process time 532 will be referred to as "scan time" in this specification. That is to say, in FIG. 48, sequence process time 531a of the first scan time contains interrupt process time 533a and 533b, and END process time 532a contains communication process time 534a, service process time 535a, and other END process time 536a. Similarly, sequence process time 531b and END process time 532b which constitute the subsequent time contain various sorts of process time 533c, 533d, 534b, 535b, and 536b in accordance with contents of the process operations under execution.

As described above, the control of the conventional CPU 1 shown in FIG. 45 is to perform the repeating process operation as indicated in FIG. 47. In this case, for instance, when the computer 6 issues the processing request to the CPU unit 1, the CPU unit 1 recognizes it as the processing request derived from the special function unit 5 and performs the process operation via the special function unit 5. Then, the CPU unit 1 supplies this process result to the special function unit 5. Since the process 5232 of FIG. 47 responding to the request issued from this special function unit 5 is carried out during the END process 523, when the request is issued from the special function unit 5, the END process time 532 is temporarily increased. Also, since the execution process 524 of the interrupt program is performed when the interrupt is produced from the interrupt producing circuit 17 of FIG. 45, timing at which the interrupt program is executed and the times of execution are not constant, so that the sequence process time 531 of FIG. 48 is increased/decreased, depending on the sequence process time 531 of FIG. 48. As a result, the process time carried by the CPU unit 1 for every scan, which is constructed of the sequence process time 531 and the END process time 532 shown in FIG. 48, is not constant. Thus, the acquisition of the input signal and the output timing of the output signal become very complex. As described above, when the user would meet insufficient controls by the PC (programmable controller), this user should necessarily grasp the control conditions of the CPU unit 1 so as to check the reasons of such insufficient controls.

With reference to FIGS. 45 and 49, a description will now be made of a method for measuring changing time of a device condition, namely one of the control conditions of the CPU unit 1, for instance, a time duration during which the condition of the bit device X0 indicative of a certain input signal is ON. FIG. 49 schematically indicates one example of the sequence program used to measure the time duration during which the condition of the bit device X0 indicative of the input signal is ON. It should be noted that the bit device X0 corresponds to, for instance, an input signal of the limit switch 4a and the like in FIG. 45. In FIG. 49, reference numerals 541 to 543 indicate symbols of the respective commands. Reference numeral 541 shows a load command conducted when the bit device X0 is under ON state. Reference numeral 542 indicates a load negate command conducted when the bit device X0 is under OFF state. Reference numeral 543 is a timer command for commencing time measurement under conducting condition to store elapse time into the timer device, where K100 represents that a time period up to 1 second is measured. Reference numeral 544 indicates a transfer pulse command for storing the content of the timer device T0 into the word device D0 when the rising portion of the conducting state is detected.

Operations of the sequence program shown in FIG. 49 will now be described. That is, when the bit device X0 becomes ON, the load command 541 is conducted to activate the timer command 543, so that the contents of the timer device T0 are sequentially added by 1 every 10 ms. To the contrary, when the bit device X0 becomes OFF, the load negate command 542 is conducted so that the content of the timer device T0 corresponding to the present measurement time is stored into the device D0 in response to the transfer pulse command 544, and further the load command 541 becomes non-conductive, whereby the operation of the timer command 543 is stopped and the content of the timer device T0 becomes 0. The user adds this sequence program to the main sequence program so as to operate the CPU unit 1. As a result, the time period during which the bit device X0 is under ON state is continuously stored into the device D0, and therefore while the device condition of the device D0 is monitored by the outer peripheral unit 2, an interval between the condition changes may be detected. However, since the sequence program of FIG. 49 is executed every time the main program of the CPU unit 1 is repeatedly processed in accordance with this method, there are some possibilities that such an error of 1 scan time, namely the respective processing time period of the CPU unit 1, as previously explained in FIG. 48, may occur. Moreover, to achieve the current measurement, it is required to directly measure the input signal by the logic analyzer 20 shown in FIG. 45.

A description will now be made of another method for measuring the process time of the designated section of the sequence program, i.e., one of these control conditions of the CPU unit 1. The means for measuring the process time defined from the first step of the main sequence program until a certain designated step thereof during execution of the sequence process is described in Japanese Unexamined Patent Publication No. Hei. 5-189277. Thus, when measuring the process time for a certain designated section of the main sequence program during the execution of the sequence process, for instance the time to process the sequence program defined from the step 100 to the step 200, both of the execution process time up to the starting step of this designated section, namely from the step 0 to the step 100, and the execution process time up to the end step thereof, namely from the step 0 to the step 200 are measured by employing the above-described means. Then, the former execution process time up to the starting step is subtracted from the latter execution process time up to the end step, whereby the process time to execute the sequence program during the designated section, namely from the step 100 to the step 200 is calculated and then can be measured.

Referring now to FIGS. 45, 47 and 50, an explanation will be made as to a method for measuring the execution time of the interrupt sequence program corresponding to one of other control conditions by the CPU unit 1. FIG. 50 shows an example of a sequence program for measuring the process time of the interrupt sequence program 554. In this drawing, reference numeral 551 indicates a pointer IO indicative of the head of the interrupt sequence program 554, reference numeral 552 shows a load command which is conducted when the bit device M9036 is under ON state, and reference numerals 553, 557 show output commands for caucusing the bit device Y0 to be ON under conductive state, and for causing the bit device Y0 to be OFF under non-conductive state. Reference numeral 555 is a load negate command which is conducted when the bit device M9036 is under OFF state, and reference numeral 558 is an IRET command indicative of the end of the interrupt sequence program.

Operations of the sequence program represented in FIG. 50 will now be described. That is, when the interrupt program defined at the step 524 of FIG. 47 is executed, the load instruction 552 located at the beginning of the interrupt sequence program 554 of FIG. 50 is conducted, depending on the condition of the bit device M9036 which is continuously ON, and then the bit device Y0 is caused to be ON by the output command 553. The bit device Y0 is, for instance, the output signal from the lamp 5b. Subsequently, the originally provided interrupt sequence program 554 is executed, and the load negate command 555 just before the interrupt sequence program is brought into the non-conductive state, and the bit device Y0 is OFF. Then, the interrupt sequence program 554 is accomplished by the IRET command 558. As a consequence, this sequence program is added to the interrupt sequence program by the user so as to be operated by the CPU unit 1. Thus, while the interrupt sequence program is executed, the bit device Y0 is under ON state, and the output signal corresponding to this device Y0 is measured by using the logic analyzer 20 functioning as the external measuring device of FIG. 45, so that the execution time of the interrupt program can be acquired.

Referring now to FIG. 45, FIG. 47, FIG. 51, a description will be made of a method for measuring the execution time of the END process corresponding to one of other control conditions of the CPU unit 1. FIG. 51 is an example of a sequence program for measuring a time duration required to perform the END process. In FIG. 51, reference numeral 564 shows a main sequence program which should be in principle executed. Reference numeral 562 is a load negate command which is conducted when the bit device M9036 is under OFF state. Reference numerals 563 and 567 are output commands for causing the bit device Y0 to be ON under conductive state, and for causing the bit device Y0 to be OFF under non-conductive state. Reference numeral 565 shows a load command which is conducted when the bit device M9036 is under ON state. Reference numeral 568 is an FEND command indicative of the end of this main sequence program.

Now, operations of the sequence program shown in FIG. 51 will be explained. That is, when the process operation of the sequence process operation of FIG. 47 is executed, the load negate command 562 present at the beginning of the main sequence program 564 of FIG. 51 becomes non-conductive, depending upon the condition of the bit device M9036 which is continuously ON, and then the output command 553 causes the bit device Y0 to be OFF. Subsequently, the main sequence program 564 is executed, so that the load command 565 located just before the main sequence program is brought into the conductive state and the bit device Y0 is turned ON. Then, in response to the FEND command 568, the main sequence program 564 is accomplished. Thereafter, the process operation is advanced to a step 523 of the END process shown in FIG. 47, at which the sequence process at the step 522 is again executed. Then, the bit device Y0 is turned OFF and ON in a similar manner. While the main sequence program 564 is executed, the device Y0 is turned OFF by this repetition. While the device Y0 is turned ON, it is understood that the END process is carried out. As a result, the user adds this sequence program to the main sequence program to be operated by the CPU unit 1. Then, the output signal corresponding to this bit device Y0 is measured by utilizing the logic analyzer 20 functioning as the external measuring device of FIG. 45, so that the execution time for the END process and the execution time for the sequence process can be measured.

An explanation will now be made of a method for measuring the process time of the special unit service, corresponding to one of other control conditions of the CPU unit 1. In the method for measuring the process time of the special unit service, the method for measuring the execution time of the END process shown in FIG. 51, is employed as previously described. First, the process time of the END process 523 shown in FIG. 47 is measured under such condition that no request is issued from the special function unit 5 of FIG. 45. Next, the process time of the END process 523 is similarly measured under such condition that a request is issued from the special function unit 5. Then, the END process time measured when no request is issued from the special function unit 5, is subtracted from the END process time when the request is issued from the special function unit 5, whereby it is possible to obtain the process time of the END process 513 for the request issued from the special function unit 5.

With reference to FIG. 52, a description will now be made of a method for investigating how many times the interrupt sequence program is executed within a constant time period, corresponding to one of other control conditions of the CPU unit 1. FIG. 52 shows one example of a sequence program for measuring the execution times of interrupt sequence program. In FIG. 52, reference numerals 571 and 577 are load instructions which are conducted when the bit device M9036 is under ON state. Reference numerals 572 and 576 denote output commands for outputting the conductive condition to the bit device M0. Reference numeral 573 indicates a transfer command for storing the constant "0" to the content of the word device D0 under conductive condition. Reference numeral 574 shows the original main sequence program. Reference numeral 575 is a load negate command which is conducted when the bit device M9036 is under OFF state. Reference numeral 578 is a transfer command for storing the content of the word device D0 into the content of the word device D1 under conductive condition. Reference numeral 579 shows an FEND command indicative of an end of the main sequence program 574. Reference numeral 5710 is a pointer representative of a head of the interrupt sequence program 5711. Reference numeral 5711 shows the original interrupt program. Reference numeral 5712 is a load instruction which becomes conductive when the bit device M0 is under ON state. Reference numeral 5713 is an adding command for adding 1 to the content of the word device D0 under conductive state. Reference numeral 5714 is an IRET command for indicating an end of the interrupt sequence program.

In the example shown in FIG. 52, such a measurement is carried out based on the number of times the interrupt sequence program subsequent to the interrupt pointer (IO) 5710 is performed within the time duration during which the main sequence program is performed one time. This sequence program is operated as follows. At the beginning, both the load command 571 and the output command 572 cause the bit device M0 to be turned ON, and the transfer command 573 causes the content of the word device D0 to be 0. Subsequently, the original main sequence program is executed, and both the load negate command 575 and the output command 576 cause the bit device M0 to be turned OFF. When the interrupt sequence program 5711, after the interrupt point (IO) 5710 as the interrupt process, is performed during the above-described operation, if the bit device M0 is turned ON by the load instruction 5712 and the adding instruction 5713, then the content of the word device D0 is incremented by 1, and also the execution of the interrupt sequence program 5711 is accomplished in response to the IRET command 5714. Accordingly, since the bit device M0 is turned ON while the main sequence program 574 is executed, the execution times of the interrupt sequence program 5711 subsequent to the interrupt pointer (IO) 5710, which has been executed during this ON time period, are stored into the content of the word device D0. This value is transferred to the content of the word device D1 in response to the load instruction 577 and the transfer instruction 578. As a consequence, the user adds this sequence program to the sequence program which is operated by the CPU unit 1, and also the content of this word device D1 is monitored by employing the external peripheral unit 2, so that it could be recognized how many times the interrupt sequence program subsequent to the interrupt pointer (IO) 5710 has been executed while the main sequence program is performed one time.

Next, the execution times of the service process in response to the processing request issued from the special unit 5 could not be measured by adding the sequence program.

Referring to FIGS. 45, 47 and 53, a description will now be made of a method for measuring interval time of starting the execution of the interrupt sequence program, corresponding to one of other control conditions of the CPU unit 1. FIG. 53 shows an example of a sequence program for measuring the interval time of starting of the execution of the interrupt sequence program. In this drawing, reference numeral 551 indicates a pointer IO indicative of the head of the interrupt sequence program 554, reference numeral 582 shows a load command which is conducted when the bit device M9036 is under ON state, and reference numeral 583 indicates a transfer command for storing the content of the word device D9022 into the word device D0 under conductive condition. Reference numeral 584 is a subtraction command for subtracting the content of the word device D1 from the content of the word device D0 under conductive condition to store the subtracted value into the word device D2. Reference numeral 585 shows a transfer command for storing the content of the word device D0 into the word device D1 under conductive condition. Reference numeral 586 is the original interrupt sequence program, and reference numeral 587 is an IRET command indicative of an end of the interrupt sequence program 586. In response to the transfer command 583, the content of the word device D9022 for transfer destination is incremented by 1 by the CPU 10 every 1 second.

Operations of the sequence program shown in FIG. 53 will now be described. That is, in response to the load command 582 and the transfer command 583, the content of the word device D9022 corresponding to the count value of the counter at this time is saved to the word device D0. Then, in accordance with the subtraction instruction 584, the content of the word device D1 into which the count value at the preceding interrupt has been stored is subtracted from the content of the word device D0. The subtraction result is stored into the word device D2. Then, in response to the transfer command 585, the saved content of the word device D0 is stored into the word device D1 to be used during the next interrupt. As a result, the user adds this sequence program to the interrupt sequence program to be operated by the CPU unit 1, so that the interval time of starting the execution of the interrupt sequence program in unit of 1 second is stored into the word device D2 every time the interrupt sequence program subsequent to the interrupt pointer IO is performed. Accordingly, the interval time of starting the execution of the interrupt sequence program 587 could be obtained by monitoring the content of the word device D2 by way of the external peripheral device 2.

A method for measuring an interval of executing a process operation when a request is issued from the special function unit 5, corresponding to one of other control conditions of the CPU unit 1 will now be described with reference to FIG. 45 and FIG. 54. FIG. 54 shows an example of a sequence program for measuring the time interval of executing the process operation when the request is made from the special function unit 5 of FIG. 45. Here, reference numeral 592 shows a load command which is conducted when the bit device Y1E is under ON state, and reference numeral 593 denotes a transfer pulse command for storing the content of the word device D9022 into the word device D0 when the rising portion of the conductive condition is detected. Reference numeral 594 is a subtraction pulse command for subtracting the content of the word device D1 from the content of the word device D0 when the rising portion of the conductive condition is detected, and for storing the subtraction result into the word device D2. Reference number 595 shows a transfer pulse command for storing the content of the word device D0 into the word device D1 when the rising portion of the conductive condition is detected. Reference numeral 596 is the original interrupt sequence program. Reference numeral 597 shows an IRET instruction for indicating a completion of the interrupt sequence program 596. It should be noted that the bit device Y1E of the load instruction 592 corresponds to such a bit device which is ON when the request is issued from the special function unit 5, and the content of the word device D9022 to which the transfer pulse command 593 is transferred is incremented by 1 by the CPU 10 every one second.

Operations of the sequence program indicated in FIG. 54 will now be explained. That is, in response to the load command 592 and the transfer pulse command 593, when the request is issued from the special function unit 5 of FIG. 45, the content of the word device D9022 functioning as the counter at this time is saved to the word device D0. Then, in accordance with the subtraction pulse command 594, the content of the word device D1 into which the count value when the request was issued from the special function unit 5 at the previous execution has been stored is subtracted from the word device D0. The subtraction result is stored into the word device D2. In response to the transfer pulse command 595, the content of the saved word device D0 is stored into the word device D1 which will be used when another request is issued from the special function unit at the next time. As a consequence, when this sequence program is added to the main program by the user to be operated by the CPU unit 1, if the request is issued from the special function unit 5, then this sequence program 596 is performed, and the interval time of the requests issued from the special function unit 5 in unit of 1 second is stored into the word device D2. Therefore, the content of the word device D2 is monitored by the external peripheral unit 2, so that the interval time of the request issued from the special function unit 5 could be measured.

Since the programmable controller directly controls such high speed operating machines as motors and robots, it is very important to detect delicate timings of the signals. When extraordinary operation happens to occur in the actual location, the reason for this extraordinary operation should be immediately investigated. However, in accordance with the above-described conventional method, the sequence program to detect timings must be added. It is not practically preferable to modify the program of the system under operation.

Also, the method for grasping the internal operation condition which is effected when the sequence program is debugged by the programmer cannot be easily achieved, because the debugging sequence program is added to be executed. Further, there are some possibilities that the operation conditions of the CPU are differed from each other. There is another problem that an external measuring device is needed in the method of using the external measuring device.

In addition, there is another problem that since the execution time of the processing request issued from the special function unit 5 within a constant time cannot be measured, the detailed operation condition of PC cannot be recognized.

To measure the time required to perform the process operation by the CPU unit 1 in response to the request from the special function unit 5, the time measuring sequence program may be established by the user. In this case, since the initiation signal from the special unit 5 is fetched into the CPU unit 1 during the END process of the sequence program, precision in the actual initiating interval time is deteriorate, so that cumbersome programming works of the user are required.

The data comparing circuit 19 of FIG. 45 is disclosed in Japanese Unexamined Patent Publication Nos. Hei. 3-244003 and Hei. 4-151702. However, this data comparing circuit is only used to stop the operation and lock the data when the content of the device memory is under designation, but is not used to detect the time intervals under ON-line condition.

To measure the process time of a certain designated section of the sequence program under execution of the sequence process, the interrupt is issued at two steps within the designated section, namely the starting step and the end step, under execution of the sequence process. As a result, more than two sets of address comparing circuits 18 shown in FIG. 45 for producing the interrupt at an arbitrary step are required.

As to the execution time of the interrupt program, very recently, the high speed control apparatuses have become available. There are many cases that the interrupt program is used as the process operation with the higher priority which requires the high speed characteristics. It is a very important factor in the system design to achieve balance between the overall control performance of the main program and the interrupt program. However, since the total time of the execution time for the main program and the execution time for the interrupt program is detected as the scan time in the conventional method, it is difficult to judge whether the lengthy scan time is caused by executing the main program itself, or by executing the interrupt program when the scan time exceeds predicted time. When the initiating interval of the interrupt program is measured by the program shown as in FIG. 53 by the user, this ladder program must be inserted into the head of the interrupt program. When the quantity of the interrupt program is increased, there is another problem that the programming work by the user becomes cumbersome. Furthermore, there is a further problem that the actual processing time of the interrupt program would be prolonged since these processes are executed on the ladder program.

SUMMARY OF THE INVENTION

The present invention is intended to solve the above-described problems.

According to the invention, a program controller comprises a control program storage unit for storing a control program for measuring an internal operation state of a CPU unit, and an internal operation state storage unit for storing a measured internal operation state of the CPU unit, wherein the internal operation measuring control program enables the internal operation state of the CPU unit to be measured in response to a monitor processing request from an external peripheral device, and a measurement result to be sent to the external peripheral device, to thereby allow the external peripheral device to monitor the internal operation state of the CPU unit.

The programmable controller may further comprise an interrupt generating circuit for monitoring a state of a designated device, and for sending an interrupt signal to the CPU at a time instant when the designated device assumes a designated state, means for measuring an ON or OFF interval of the designated device, time measurement storage unit for storing the measured ON or OFF interval of the designated device, and means for displaying data of the time measurement storage unit on the external peripheral appliance, whereby a time period until the designated device changes its state can be measured without using a user program.

The programmable controller may further comprise means for measuring a process time of a designated section of the sequence program, whereby a measurement result of the process time can be monitored by the external peripheral device. Thus, the process time of the designated section can be measured by use of a single address comparing circuit.

The programmable controller may further comprise means for measuring an accumulated execution time of time periods during which interrupt programs are executed in one scan of the sequence program, an interrupt accumulation storage unit for storing the measured accumulated execution time of the interrupt programs, and means for displaying data of the interrupt accumulation storage unit on the external peripheral appliance, whereby an influence of execution times of the interrupt programs on a scan time can be measured.

The programmable controller may further comprise means for measuring a process time of an END process, whereby a measurement result of the process time can be monitored by the external peripheral device. A user is not required to alter the sequence program.

The programmable controller may further comprise means for measuring a process time during which a service program is executed in response to a processing request from a special function unit, whereby a measurement result of the process time can be monitored by the external peripheral device. A user is not required to alter the sequence program.

The programmable controller may further comprise means for measuring the number of execution times of an interrupt program activated by an external interrupt signal, whereby a measurement result of the number of execution times can be monitored by the external peripheral device. A user is not required to alter the sequence program.

The programmable controller may further comprise means for measuring the number of execution times of a service program executed in response to a processing request from a special function unit, whereby a measurement result of the number of execution times can be monitored by the external peripheral device. The number of execution times of the service program could not be measured conventionally from the user side.

The programmable controller may further comprise means for measuring an activation interval of an interrupt program that is activated in response to an external interrupt signal, whereby a measurement result of the activation interval can be monitored by the external peripheral device. A user is not required to alter the sequence program.

The programmable controller may further comprise means for measuring an interval between various processing requests from the external peripheral device and a special function unit, whereby a measurement result of the interval can be monitored by the external peripheral device. A user is not required to alter the sequence program.

BRIEF DESCRIPTION OF THE DRAWINGS

FIG. 2 shows the overall structure of a program of the PC of FIG. 1;

FIG. 5 shows a configuration of a data RAM in the CPU unit of PC shown in FIG. 1;

FIG. 6 illustrates device codes in Embodiment 1 of the invention;

FIG. 7 illustrates measurement condition codes in Embodiment 1 of the invention;

FIG. 8 illustrates transition of a device interval measuring flag in Embodiment 1 of the invention;

FIG. 16 illustrates an example of a displayed picture of a measurement result in the external peripheral device in Embodiment 1 of the invention;

FIG. 17 shows an example of a general sequence program of the PC of FIG. 1;

FIG. 26 is a flow chart showing user operations and a process performed by the external peripheral device in Embodiment 3 of the invention;

FIG. 27 illustrates a structure of data exchanged between the external peripheral device and the CPU unit in Embodiment 3 of the invention;

FIG. 44 is a flow chart showing a process performed by the CPU unit in response to a special unit service process execution interval reading request from the external peripheral device in Embodiment 9 of the invention;

FIG. 46 shows the overall structure of a conventional program;

DESCRIPTION OF THE PREFERRED EMBODIMENTS

EMBODIMENT 1

An embodiment of the present invention will now be described with reference to FIGS. 1 to 17.

Figure 1:
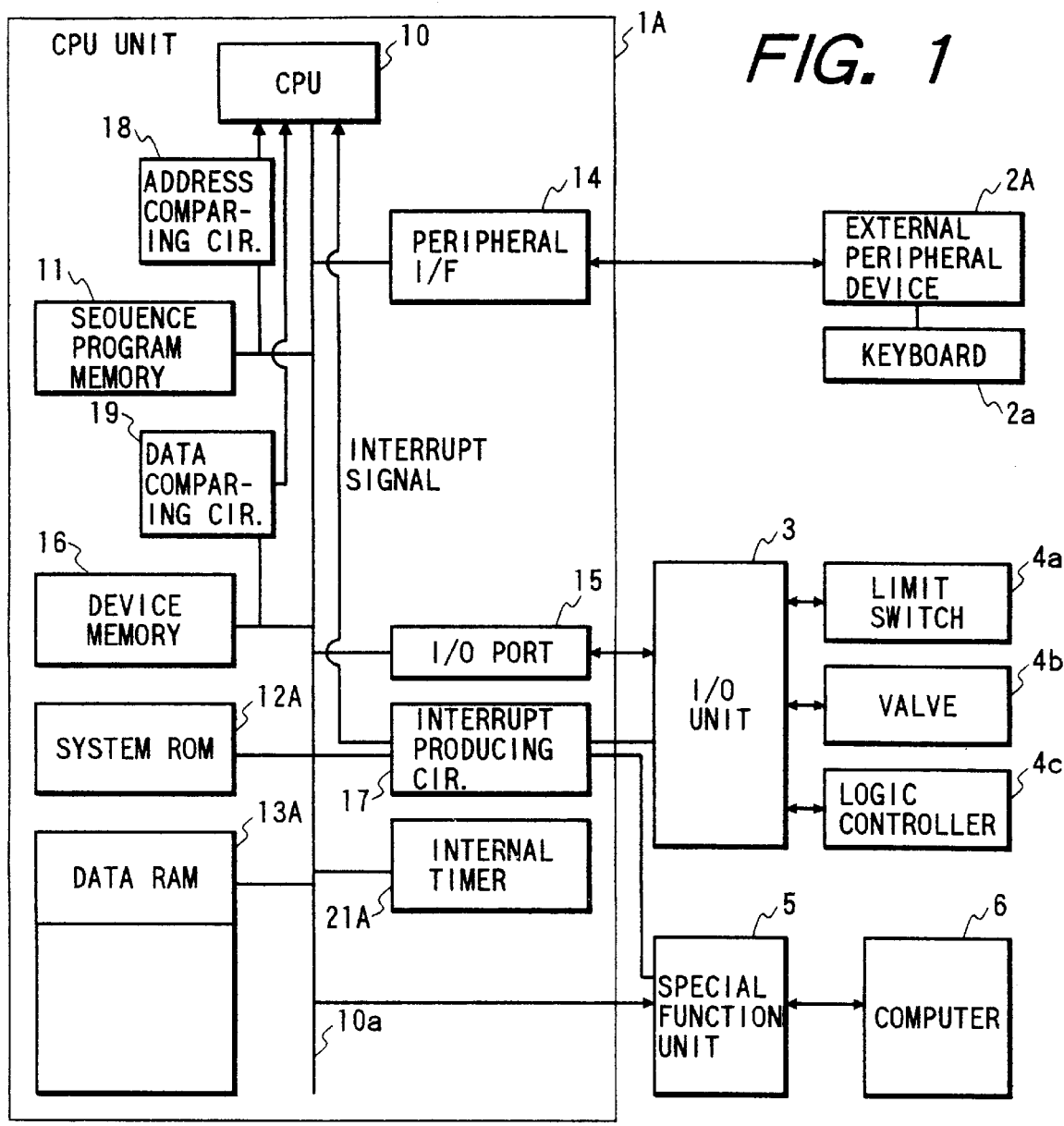
FIG. 1 shows a configuration of PC according to an embodiment of the present invention.

FIG. 1 is a schematic block diagram for showing an arrangement of a PC (programmable controller) according to an embodiment of the present invention. In this drawing, symbol 1A shows a CPU unit of the PC according to the present invention, symbol 2A denotes an external peripheral device such as a personal computer for displaying a monitoring result according to the present invention. Reference numerals 3 to 11, 14 to 19, and 12A represent those for showing the same circuit elements as in the prior art. Symbol 12A is a system ROM for storing a system program of the present PC which has been modified to perform a process for storing the operation conditions of the PC as data. Symbol 13A is a data RAM in which the operation condition of the PC is additionally stored as the data.

Figure 47:
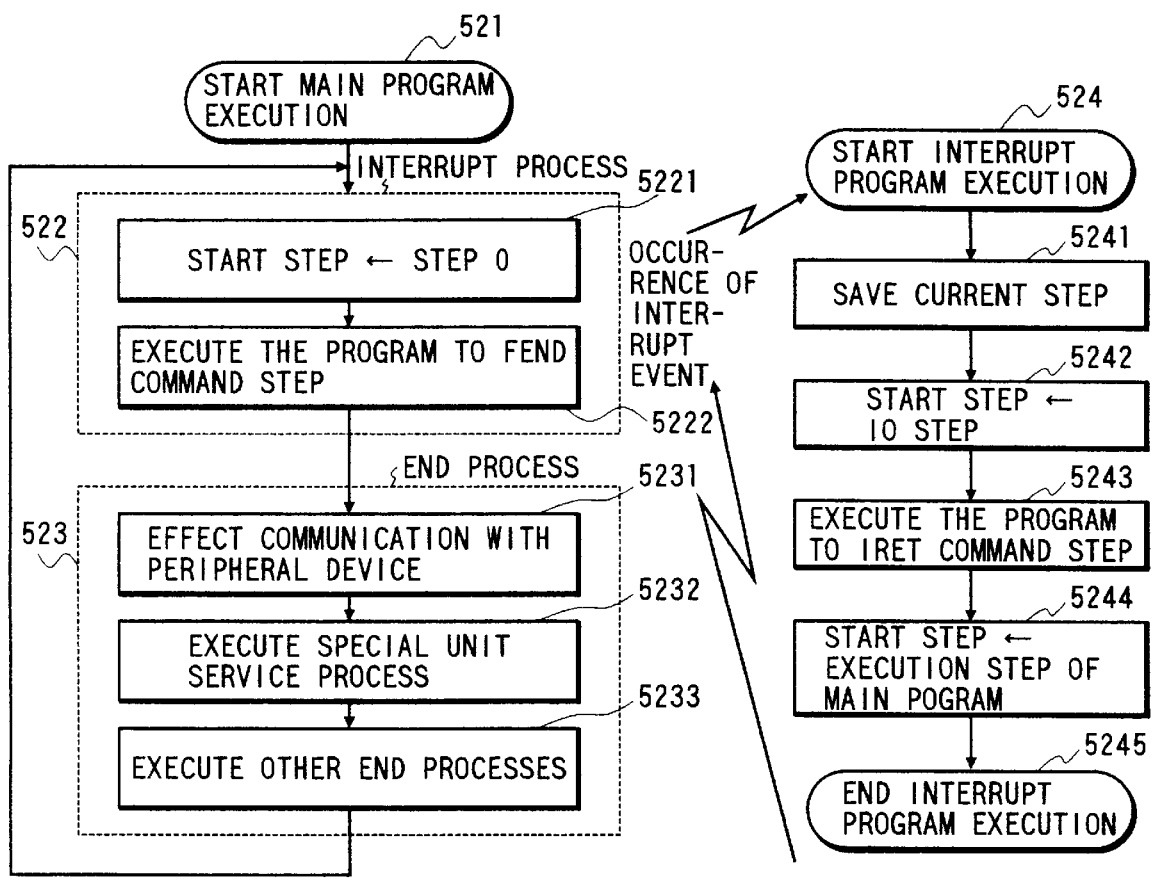
FIG. 47 is a flow chart showing a general process of the conventional PC of FIG. 45.
Figure 48:
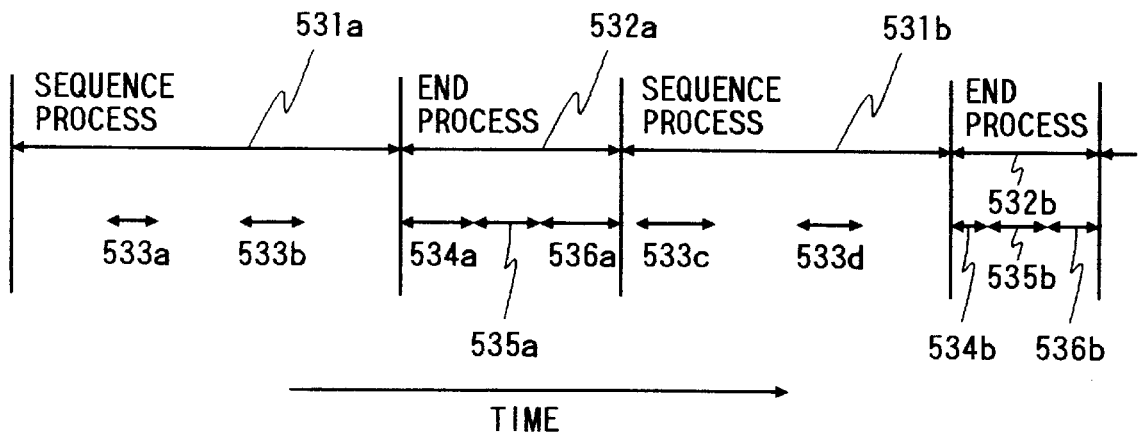
FIG. 48 illustrates conventional processing of a main program and an interrupt program.
Figure 49:
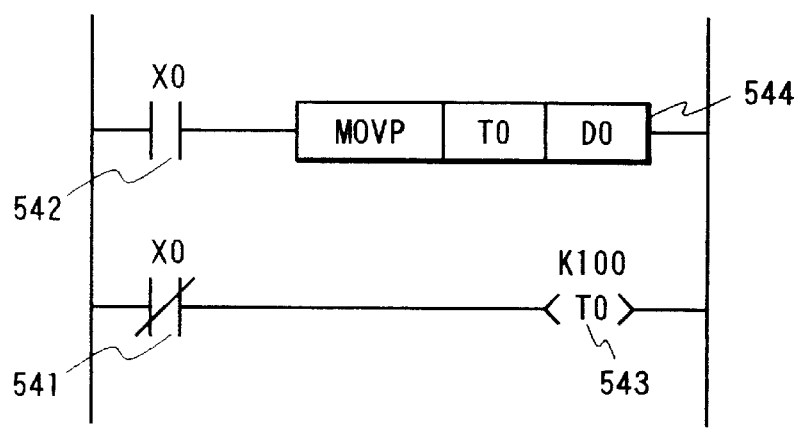
FIG. 49 shows an example of a conventional sequence program for measuring a device interval.
Figure 50:
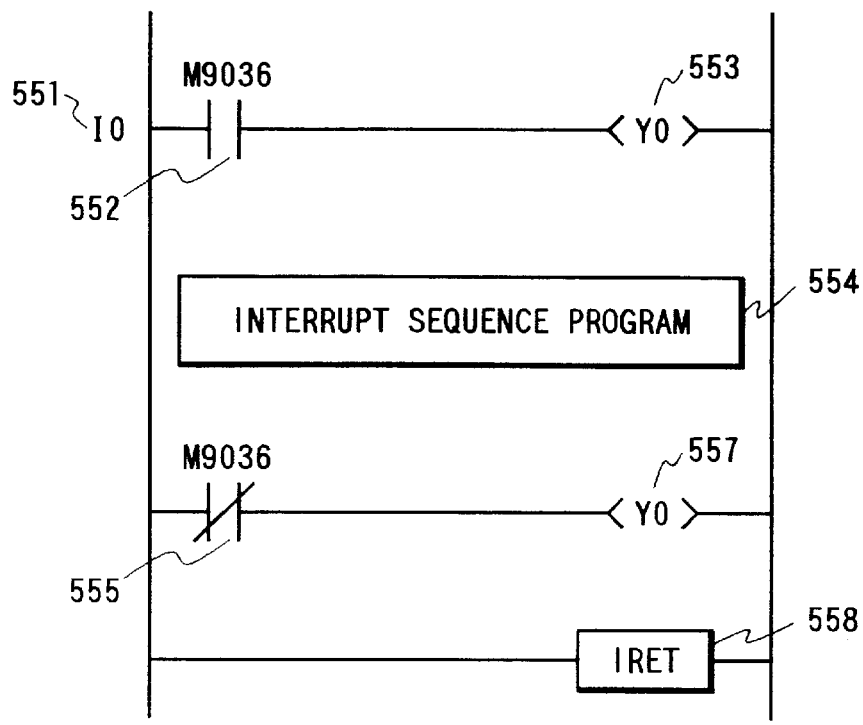
FIG. 50 shows an example of a conventional sequence program for measuring an interrupt program execution time.
Figure 51:
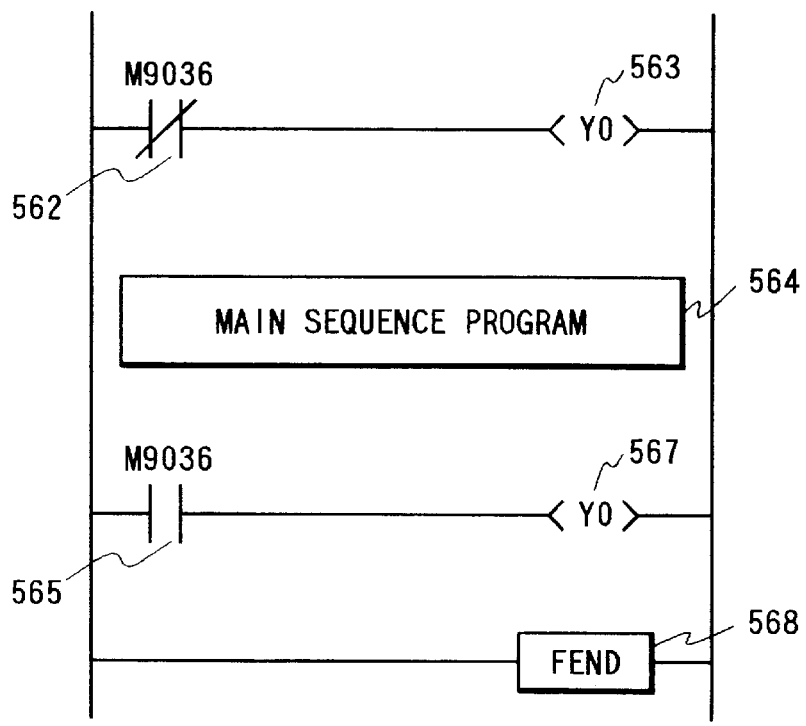
FIG. 51 shows an example of a conventional sequence program for measuring an END process time.
Figure 52:
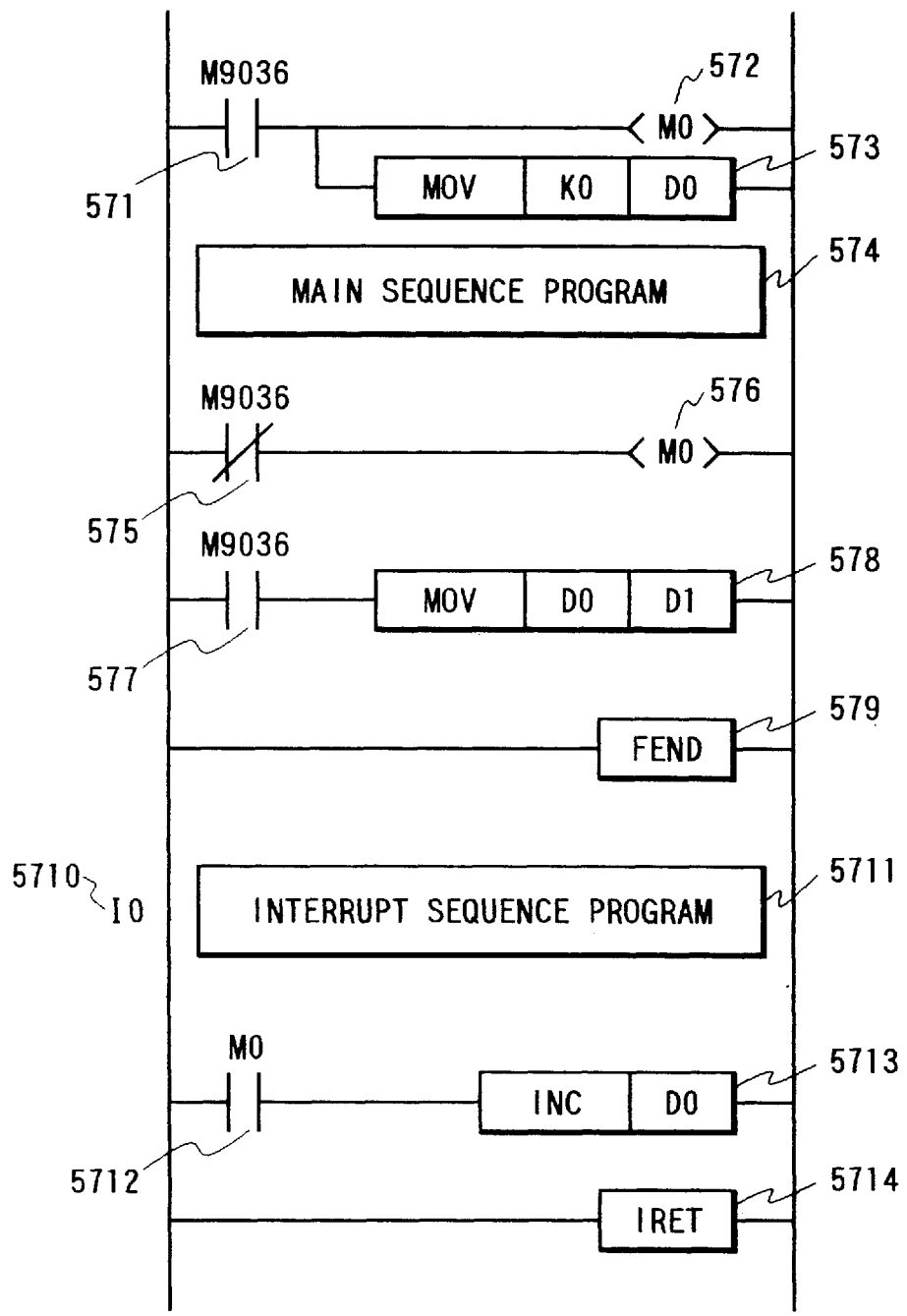
FIG. 52 shows an example of a conventional sequence program for measuring the number of interrupt program execution times.
Figure 53:
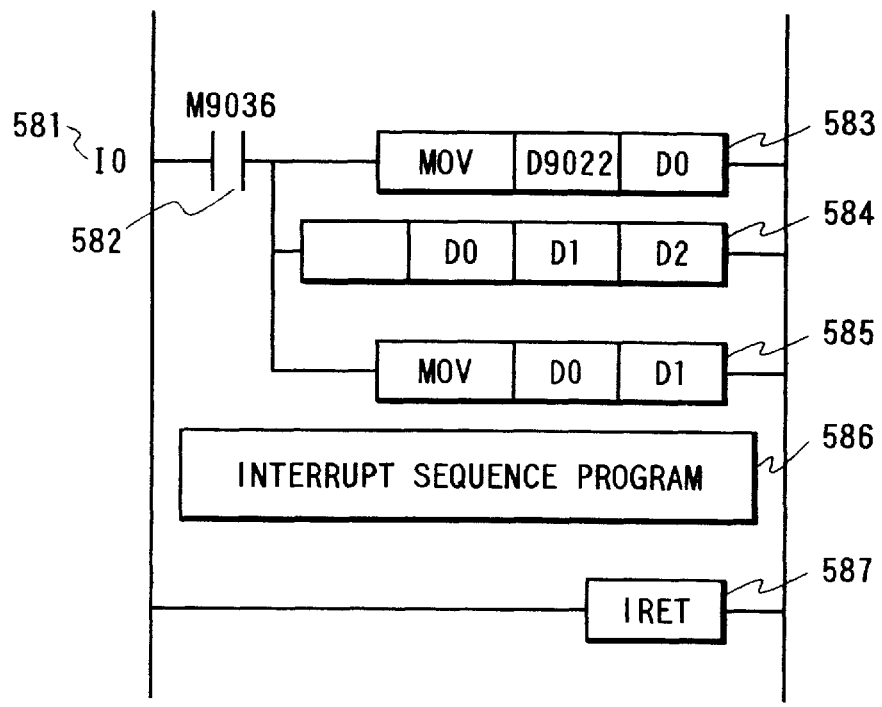
FIG. 53 shows an example of a conventional sequence program for measuring an interrupt program execution interval.
Figure 54:
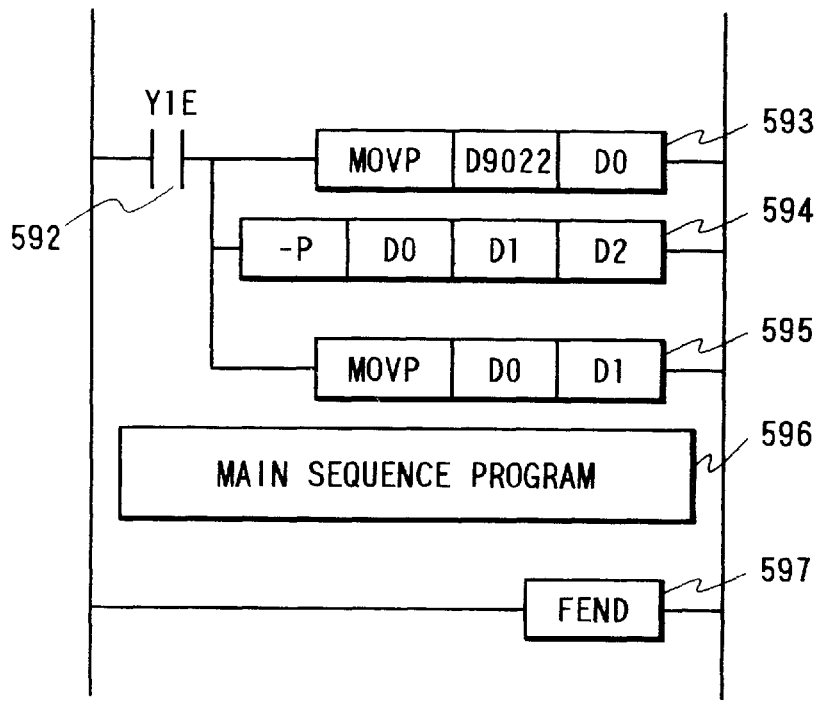
FIG. 54 shows an example of a conventional sequence program for measuring a special unit service process execution interval.

Next, FIG. 2 represents an example of process operation executed by the CPU unit 1A according to the present invention, which has been stored in the system ROM 12A shown in FIG. 1. This process operation is constituted by adding a process operation 2011 to a process operation 2017 and also a process operation 2041 to a process operation 2044 to the process operations executed by the conventional CPU unit 1 shown in FIG. 47, and further by modifying the communication process operation 2031 with the external peripheral device 2A and the special unit service process operation 2032 among the END process 203 in order that the internal operation conditions of the CPU unit 1A are stored as data in accordance with one embodiment of the present invention.

Figure 3:
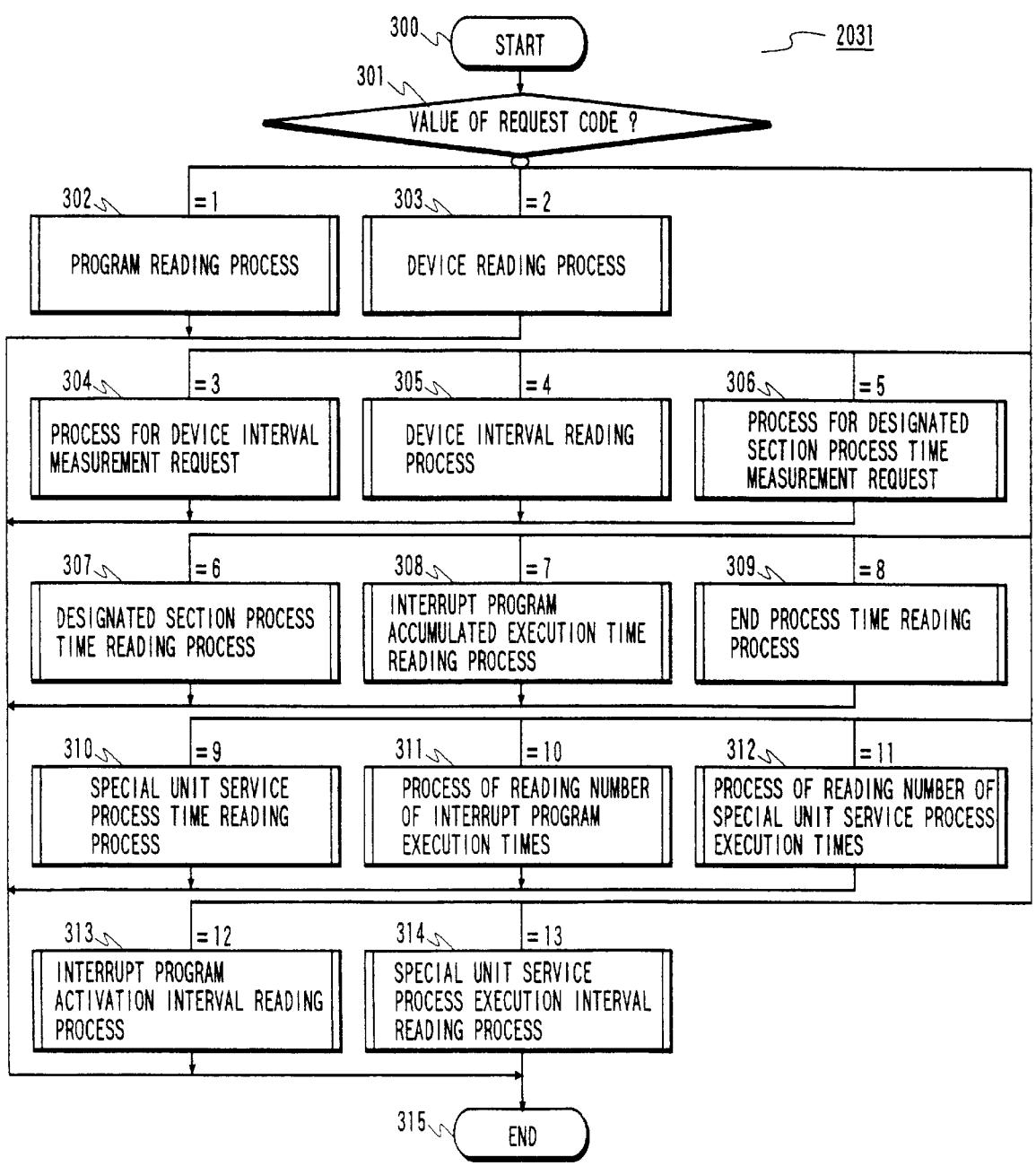
FIG. 3 is a flow chart showing a communication process with an external peripheral device in a CPU unit of the PC of FIG. 1.
Figure 33:
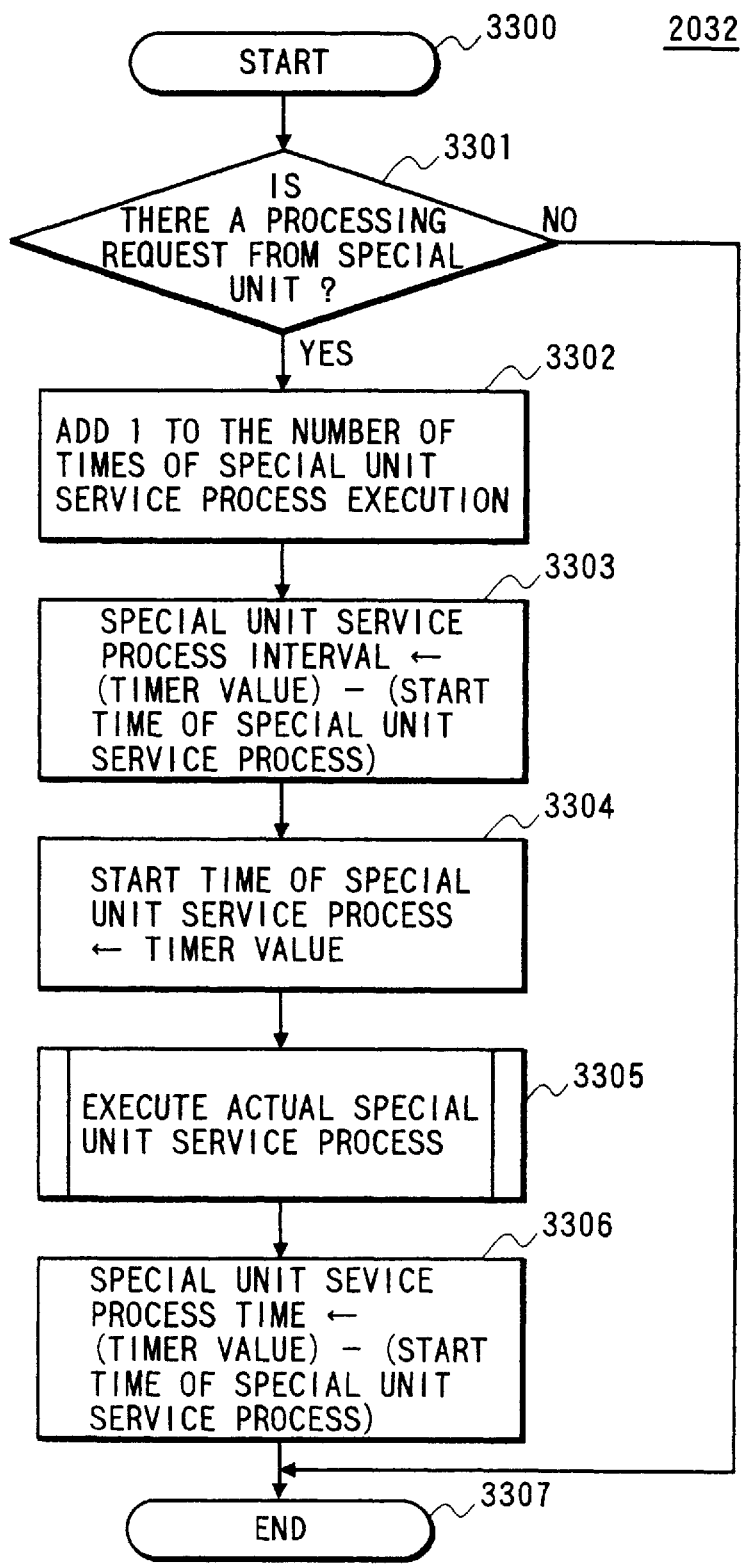
FIG. 33 is a flow chart showing a special unit service process in Embodiment 5 of the invention.

In FIG. 3, there is shown process contents of the modified communication process 2031 of FIG. 2 with the external peripheral device 2A. In FIG. 3, the process operations 304 to 314 correspond to added process operation according to the embodiment of the present invention. FIG. 33 illustrates process contents of the special unit service process 2032 (modified in FIG. 2) for executing the internal process operations in response to a request issued from the special function unit 5. In FIG. 33, the process operations 3302 to 3304 and the process operation 3306 are additionally employed in accordance with one embodiment of the present invention.

Now, the process operations executed by the CPU unit 1A shown in FIG. 2 will be explained with reference to FIG. 1 to FIG. 3 and FIG. 33. In FIG. 2, the CPU unit 1A first commences to execute the main program at a step 201. At steps 2011 to 2015, an area is initialized which stores data used to monitor the internal operating conditions of the CPU unit 1A held in the data RAM 13A. As to operations defined from the step 2011 to the step 2015, a description thereof will be made in the following embodiment. Next, at a step 202, a sequence process for performing a sequence control is executed. Similar to the conventional manner, based on a predetermined sequence program at a step 5221, the starting step is set to zero step of the main sequence program. At the next step 5222, the process operations defined from the zero step corresponding to the starting step up to the step for the FEND command. When the FEND command is executed, a step 2016, the step 203 of the END process, and a step 2017 are performed. It should be noted that the process operations defined at the step 2016 and the step 2017 are such a process operation for measuring process time of the END process 203 corresponding to one of the internal operation conditions about the CPU unit 1A, which will be discussed with reference to the following embodiment.

At the step 203 of the END process, a communication process 2031 with the external peripheral device 2A, a special unit service process 2032, and another END process 5233 are executed. In this END process 5233, a process operation is carried out for outputting or inputting input/output signals in response to the values stored in the device memory 16. Here, in the communication process 2031 with the external peripheral device 2A, the process operations as shown in FIG. 3 are carried out. In other words, the CPU unit 1A which has received the request data from the external peripheral device 2A will judge a value of a request code contained in the request data at a step 301. As a result of this judgement, the process operation is branched to process operations defined at steps 302 to 314 corresponding to the various requests. For instance, if the request code is 1, then the process operation is branched to a step 302 at which a sequence program indicative of this value is read out. If the request code is 2, then the process operation is branched to a step 303 at which a device indicative of this value is read out. It should be understood that the process steps 304 to 314 corresponding to the request codes 3 to 13 are such added processes in accordance with an embodiment of the present invention, which will be explained with reference to the subsequent embodiment. When the execution of the process operation corresponding to the request code is completed, the communication process with the external peripheral device 2A is ended at an ending step 315.

As previously explained, when the communication process 2031 of FIG. 2 with the external peripheral device 2A is completed, the process operation is advanced to the special unit service process 2032. In this special unit service process 2032, a process operation indicated in FIG. 33 is executed. That is, the process operation is started at a step 3300, and then a judgement is made as to whether or not a processing request is issued from the special function unit 5 of FIG. 1 at a step 3301. If no processing request is issued, then the process operation is branched to an end step 3307. Conversely, if the processing request is issued, then process operations defined from a step 3302 to a step 3304 are executed. Thereafter, at the next step 3305, a service real process with respect to the processing request issued from the special function unit 5 is performed. Then, a process operation defined at the subsequent step 3306 is executed, and the special unit service process 2032 at the next ending step 3307 is completed. It should be noted that the process operation defined from a step 3302 to a step 3304 and a step 3306 corresponds to such a process for measuring the process time of the specific unit service process 2032, i.e., one of the internal operation conditions of the CPU unit 1A, the operations of which will be described with reference to the subsequent embodiment. When the special unit service process 2032 is accomplished, the subsequent other END process step 5233 is performed, and then the execution of the END process 203 is completed.

When the END process 203 of FIG. 2 is ended and the process operations defined up to the step 2017 have been accomplished, the process operation is returned to the step 2014 at which the CPU unit 1 of FIG. 1 repeats the process operation. As described above, the CPU unit 1A repeatedly performs the process operation defined from the step 2014 to the step 2017.

When an interrupt signal from the interrupt producing circuit 17 of FIG. 1 is entered into the CPU 10 of FIG. 1 during this repeated execution, a process operation to execute an interrupt program shown at a step 204 of FIG. 2 is commenced. In this interrupt program execution process 204, a process operation to measure the process condition of this interrupt program execution process is carried out at a step 2041 to a step 2043. Subsequently, the process operation is advanced to a step 5241. At the next steps 5241 to 5244, the below-mentioned process operations are performed in a similar manner to the conventional interrupt program execution process 524 shown in FIG. 47. That is, at the step 5241, the step of the main sequence program under execution is saved. At the step 5242, a head step of the interrupt program is set to the starting step. At the step 5243, the process operations up to the IRET command are executed. At the step 5244, the saved step of the main program is recovered and set to the starting step. Next, step 2044 is a process operation for measuring the process conditions of the interrupt program execution process. Thereafter, the execution of the interrupt program is completed at a step 5245, and the process operation is returned to the original main program. As described above, the CPU unit 1A of FIG. 1 repeatedly performs the process operations defined from a step 2014 to a step 2017 under normal condition, as shown in FIG. 2. When an interrupt process request is issued, the CPU unit 1A performs the interrupt program execution process 204 every time this interrupt process request is issued. Thereafter, the process operation is returned to the main program.

Figure 4:
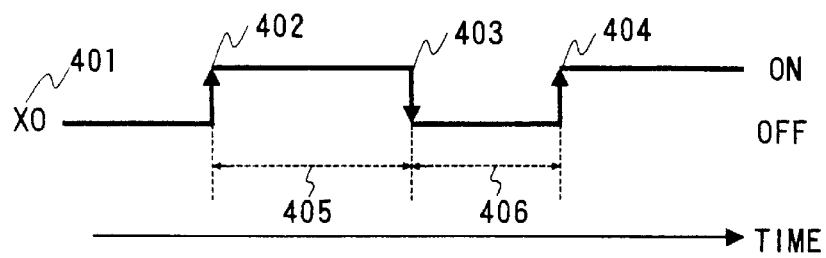
FIG. 4 illustrates a state change in a device to be measured in Embodiment 1 of the invention.

Referring to FIG. 4, a definition about ON/OFF operations of a device will now be described. In FIG. 4, a bit device X0 (401) represents an input signal derived from the input/output unit. At the beginning, this bit device is under OFF state, is changed from OFF to ON at certain time 402 after time has elapsed, and then is changed from ON to OFF at certain time 403 after time denoted by 405 has passed, thereby being brought into an OFF state. After time denoted by 406 has elapsed, this bit device X0 is again changed from OFF to ON at time 404, and is brought into ON state. The expression "device interval" used in the present invention implies either the time 405 during which the device 401 is under ON state, or the time 406 during which the device 401 is under OFF state.

A detailed structure of the data RAM 13A shown in FIG. 1 is represented in FIG. 5 and will now be described. In FIG. 5, reference numeral 501 indicates an area for storing data used to measure the device interval. Reference numeral 5011 shows a device code area for storing a code used to identify such a device to be measured. Reference numeral 5012 is a measuring condition area for storing a code used to represent whether or not the time measurement is carried out when the device is under certain condition. Reference numeral 5013 shows a device interval measuring flag area for storing a code used to indicate under which condition the process operation of the device interval is performed. Reference numeral 5014 is a starting time area for storing the time at which the measurement of the device interval is commenced. Reference numeral 5015 shows a device interval measuring result area for storing the measured device interval.

Also, reference numeral 502 shows an area for storing data used to measure the process time of the designated section of the sequence program. Reference numeral 5021 represents a starting step area for storing a starting step of the designated section. Reference numeral 5022 is an end step area for storing an end step of the designated section. Further, reference numeral 5023 shows a designated section measuring flag area for indicating under which condition the measuring process is performed. Reference numeral 5024 shows starting time area for storing time when the measurement of the designated section is commenced. Reference numeral 5025 indicates a designated section processing time area for storing the processing time of the measured designated section.

Reference numeral 503 is an area for storing data used to measure accumulation executing time of the interrupt program. Reference numeral 5031 shows an interrupt program starting time area for storing the starting time when the interrupt program is performed. Reference numeral 5032 is an interrupt program accumulation executing time area for storing the accumulation executing time of the interrupt program.

Further, reference numeral 504 shows an area for storing data used to measure the processing time of the END process. Reference numeral 5041 denotes an END process starting time area for storing the starting time of the END process. Reference numeral 5042 is an END process time area for storing the measurement result of the END process time.

Reference numeral 505 represents an area for storing data used to measure the processing time of the special unit service process. Reference numeral 5051 indicates a special unit service process starting time area for storing starting time of the special unit service process. Reference numeral 5052 denotes a special unit service processing time area for storing the measurement result of the processing time of the special unit service.

Reference numeral 506 indicates an interrupt program executed number area for storing the executed number of the interrupt program.

Reference numeral 507 denotes a special unit service process executed number area for storing the executed number of the special unit service process.

Reference numeral 508 is an interrupt program initiation interval time area for storing initiation interval time of the interrupt program.

Reference numeral 509 shows a special unit service process executing interval time area for storing the execution interval time of the special unit service.

Now, the content of the device code area 5011 of FIG. 5 used to measure the device interval according to an embodiment of the present invention is represented in FIG. 6 and then will be explained. Into this device code area 5011, the values corresponding to the device to be measured are stored. As shown in FIG. 6, the values are defined by a serial number with respect to all devices, as an example, the numbers "0" to "999" are allocated to the bit devices X0 to X999, and the numbers "1000" to "1999" are allocated to the bit devices Y0 to Y999. These serial numbers may discriminate one device from other devices.

As to the content of the device interval measuring flag area 5012 shown in FIG. 5, which is used to measure the device interval, as illustrated in FIG. 7, when the ON state is designated as the measurement condition, 1 is stored into this flag area. When the OFF state is designated as the measurement condition, 0 is stored into this flag area.

FIG. 8 represents transition of the content of the device interval measuring flag area 501 of FIG. 5. In this drawing, under state 801, when the measurement request is issued from the external peripheral device 2A, a value of 0 is stored into this flag area 5013. Under state 802, when the measurement is commenced in the CPU unit 1A, a value of 1 is stored into the flag area. Under state 803, when the measurement is completed by the CPU unit 1A, a value of 2 is stored into the flag area.

Figure 9:
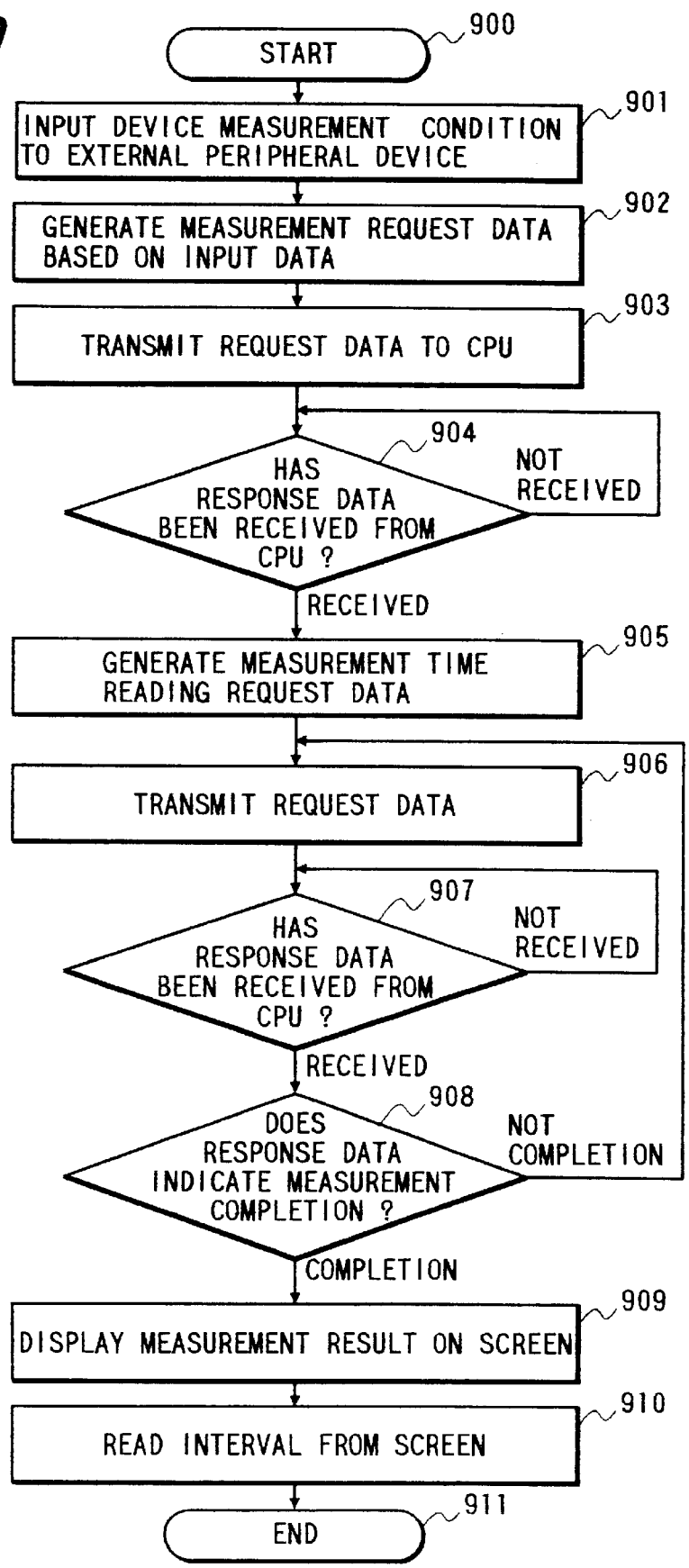
FIG. 9 is a flow chart showing user operations and a process performed by an external peripheral device in Embodiment 1 of the invention.

FIG. 9 is a flow chart for explaining a sequence to measure the device interval according to an embodiment of the present invention. A step 901 and a step 910 represent operations by the user with respect to the external peripheral device 2A. A step 902 through a step 909 represents contents of process operations by the external peripheral device 2A. It should be noted that this operation will be described in detail.

Figure 10:
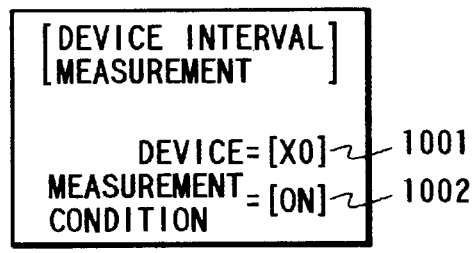
FIG. 10 shows an example of a setting picture of the external peripheral device in Embodiment 1 of the invention.

First of all, a description will now be made of operations when the device interval corresponds to one of the internal operation conditions of the CPU unit 1A according to an embodiment of the present invention with reference to FIG. 1 to FIG. 16, namely FIG. 9. In FIG. 9, when the measurement of the device interval is commenced at a step 900, the user enters the name of the device to be measured and the measurement condition through a keyboard 2a at a step 901 under such a condition that a screen shown in FIG. 10 is displayed in the external peripheral device 2A shown in FIG. 1. FIG. 10 is an example of the screen displayed by the external peripheral device 2A when the device interval is measured. In FIG. 10, reference numeral 1001 denotes an area into which the name of the device to be measured is entered. Reference numeral 1002 indicates an area into which the measurement condition is inputted. It should be noted that as to the measurement condition, when the ON-state time is measured, the ON-time may be inputted, whereas when the OFF-state time is measured, the OFF-time may be inputted. In the case of FIG. 10, the user enters X0 with respect to the device to be measured, and enters the ON-time with respect to the measurement condition. The user instructs to measure the time duration during which the bit device X0 is turned ON.

Figure 11:
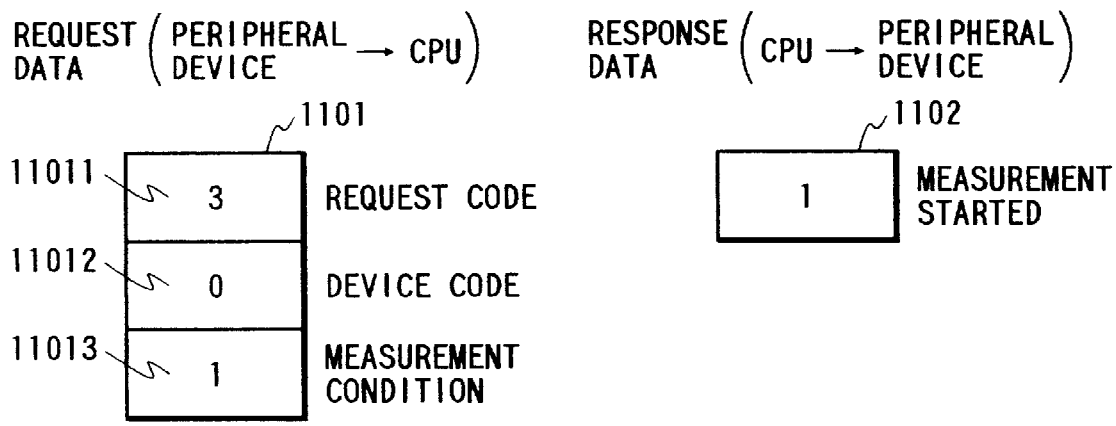
FIGS. 11 and 12 illustrate structures of data exchanged between the external peripheral device and the CPU unit in Embodiment 1 of the invention.

When the above-described data have been entered, the external peripheral device 2A produces request data 1101 shown in FIG. 11 based upon the entered data at a step 902. FIG. 11 represents a structure of data which is communicated between the external peripheral device 2A and the CPU unit 1A after the data as shown in FIG. 10 have been set by the external peripheral device 2A. Reference numeral 1101 represents a structure of request data sent from the external peripheral device 2A to the CPU unit 1A. Reference numeral 11011 indicates a request code used to instruct the measurement of the device interval. Reference numeral 11012 shows a device code to be measured. Reference numeral 11013 denotes a code indicative of the measurement condition. Reference numeral 1102 shows a structure of response data sent from the CPU unit 1A to the external peripheral device 2A in response to the request data 1101. In the example of FIG. 11, the request code 11011 becomes 3 indicative of the device interval measurement request, the device code 11012 becomes 0 as shown in FIG. 6, and the measurement condition 11013 becomes 1 as represented in FIG. 7. Next, at a step 903, this request data 1101 is transmitted to the CPU unit 1A, and at a step 904, the process operation is brought into the waiting condition until the response data from the CPU unit 1A is received.

The operations of the CPU unit 1A when the request data 1101 from the external peripheral device 2A is received will now be described by way of flow charts shown in FIG. 1 to FIG. 3 and FIG. 13. First, the CPU unit 1A of FIG. 1 which performs the main program execution process 201 shown in FIG. 2 accepts the request data 1101 of FIG. 11 in the communication process 2031 with the external peripheral device 2A of FIG. 2, and the process operation is branched to the device interval measurement request process 304 in accordance with the request code 1101 in the process 301 shown in FIG. 3. In this process 304, the process operation shown in FIG. 13 is executed, and the initial setting is performed to measure the device interval.

Figure 13:
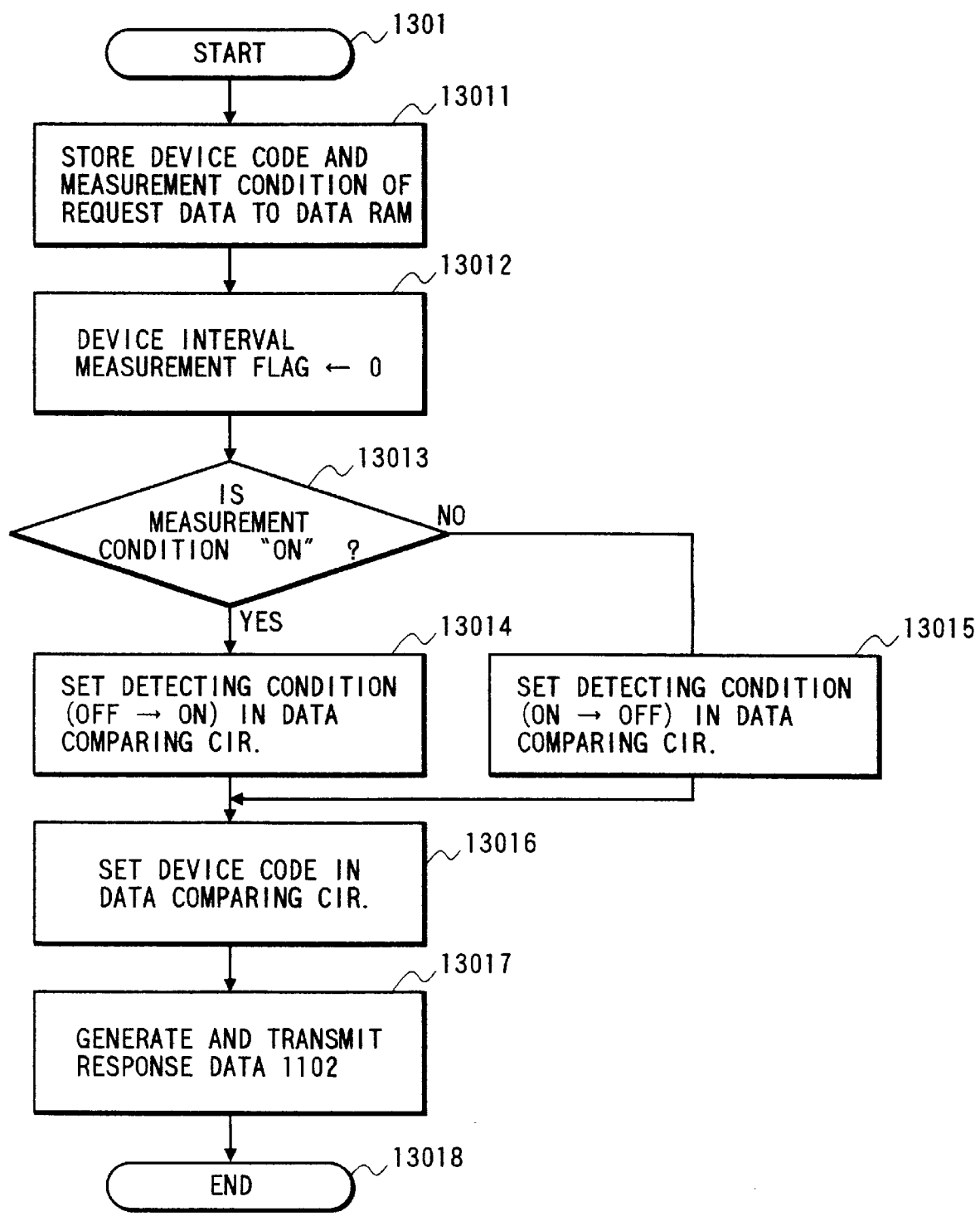
FIGS. 13 and 14 are flow charts showing a process performed by the CPU unit in response to a device interval measuring request from the external peripheral device in Embodiment 1 of the invention.
Figure 19:
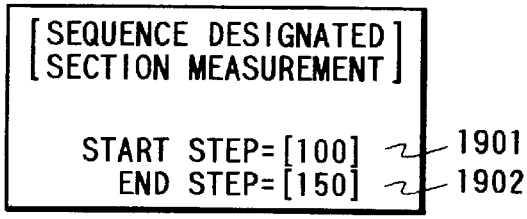
FIG. 19 shows an example of a setting picture of the external peripheral device for a process time measurement in Embodiment 2 of the invention.

In the process operation indicated in FIG. 13, the process operation is first commenced at a step 1301. In the process 13011, the device code 11012 of FIG. 11 is stored into the device code area 5011 of the data RAM 13A shown in FIG. 5. The measurement condition 11013 of FIG. 11 is stored into the measurement condition area 5012 of the data RAM 13A of FIG. 5. In the process 13012, such a value of 0 for indicating that the device interval measurement request is issued as shown in FIG. 8, is stored into the device interval measuring flag area 5013 of the data RAM 13A shown in FIG. 5. At the next process 13013, a judgement is made as to when the measurement condition 11013 of FIG. 11 is under ON state, or OFF state. In case of the ON state, the process operation is branched to a process 13013. In case of the OFF state, the process operation is branched to a process 13015. Since the measurement condition is under ON state in the example of FIG. 10, the process operation is branched to the process 13014. In this case, since the device interval measurement is commenced when the device designated by the device code 11012 of FIG. 11 is changed from the OFF state to the ON state, the detection condition of the data comparing circuit 19 of FIG. 19 is changed from OFF into ON. When the measurement condition 11013 of FIG. 11 is under OFF state, the process operation is branched from the process 13013 to the process 13015. In this process 13015, since the device interval measurement is commenced when the device designated by the device code 11012 of FIG. 11 is changed from ON to OFF, the detection condition of the data comparing circuit 19 of FIG. 1 is changed from ON to OFF. Even when the process operation is branched to any of the process 13014 and the process 13015, this process operation is advanced to a process 13016. At this process 13016, the device code 11012 of FIG. 11 is set to the data comparing circuit 19 of FIG. 1. Finally, at a process 13017, the CPU unit 1A forms such response data 1102 for indicating that the device interval measurement request process is completed. Then, the CPU unit 1A transmits this response data to the external peripheral device 2A, and the process operation is ended at a step 13018.

After the above-described process operations have been carried out, the CPU unit 1A executes the process operation subsequent to the special unit service process 2032 shown in FIG. 2, and then repeatedly executes the sequence process 202 and the END process 203 in a similar manner to those of the conventional system. During this repetitive execution, when the condition of the device designated by the device code 11012 of FIG. 11 is changed into such a condition set to the detection condition of the data comparing circuit 19 of FIG. 1, the data comparing circuit 19 issues an interrupt signal to the CPU 10 of FIG. 1. Upon receipt of this interrupt signal, the CPU 10 interrupts the execution of the main program and thus the process operation is moved to the interrupt process 1501 shown in FIG. 15.

Figure 15:
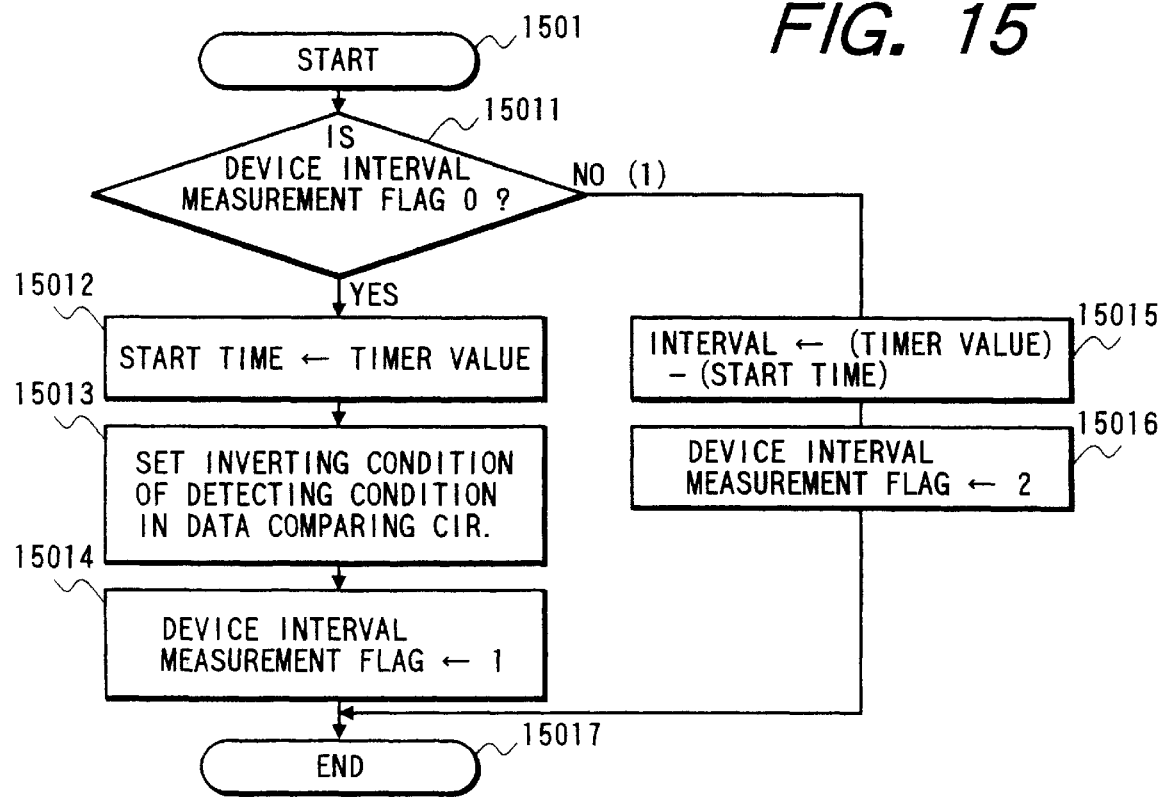
FIG. 15 is a flow chart showing an interrupt process from a data comparing circuit in Embodiment 1 of the invention.

FIG. 15 illustrates such a process operation such that the interrupt is issued from the data comparing circuit 19 of FIG. 1 during the measurement of the device interval. In this interrupt process operation 1501, a check is done at a process 15011 as to whether or not the content of the device interval measuring flag area 5013 is equal to 0. Since the present content is equal to 0, the process operation is branched to the next process 15012. At the process 15012, the present value of the internal timer 21A shown in FIG. 1 is stored into the starting time area 5014. At the subsequent process 15013, the inversion condition of the detection condition set into the data comparing circuit 19 of FIG. 1 is set to the data comparing circuit 19 as the detection condition, namely, if OFF to ON, then ON to OFF, or if ON to OFF, then OFF to ON. At a process 15014, a value of 1 indicative of the measurement start is stored into the device interval measuring flag area 5013 of FIG. 5, whereby the interrupt process is completed.

Upon completion of this interrupt process 1501, the CPU 10 restarts the execution of the main program at the step where this main program 201 of FIG. 2 is interrupted. Subsequently, when the condition of the device designated by the device code 5012 of FIG. 5 is changed, the data comparing circuit 19 of FIG. 1 produces the interrupt signal. As a result, the CPU 10 interrupts the execution of the main program, and then the process operation is advanced to the interrupt process 1501.

In the interrupt process 1501 of FIG. 15, since the content of the device interval measuring flag 5013 of FIG. 5 is equal to 1 at this time, and also the process operation at the step 15011 is interrupted, the process operation is branched to the process 15015. At this step, the value stored in the starting time area 5014 of FIG. 5 is subtracted from the present value of the internal timer 21A shown in FIG. 1, and the subtraction result is stored into the device interval measuring result area 5015 of FIG. 5. When the resultant subtracted time is, for example 30 msec, a value of 30 is stored into the device interval measuring result area 5015 of FIG. 5. Finally, a value of 2 indicative of completion of measurement is stored into the device interval measuring flag 5013 of FIG. 5 at a process 15016, and then the interrupt process is accomplished at a step 15017.

Figure 12:
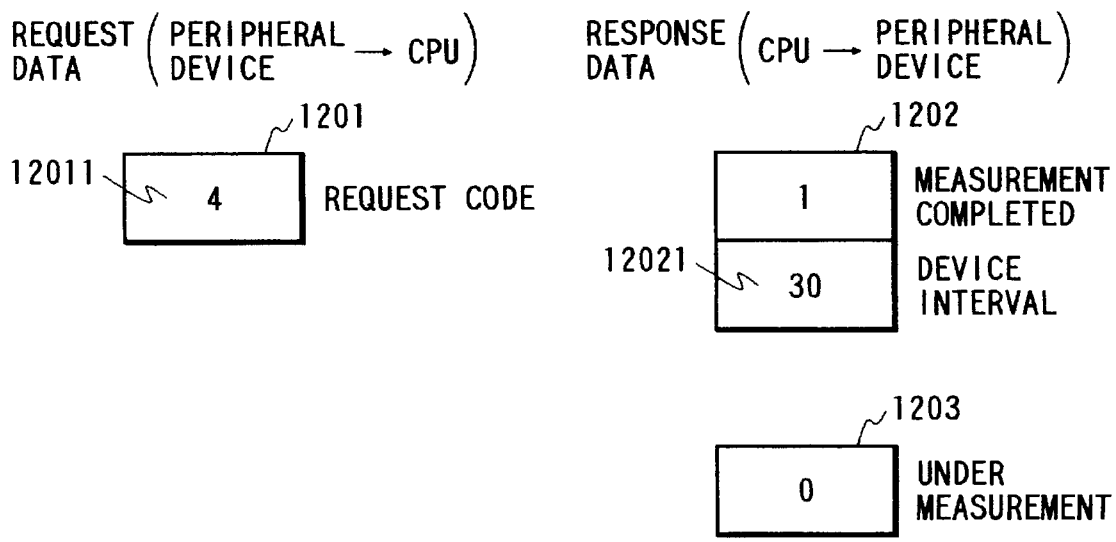

A series of the above-described process operations completely accomplished, so that the CPU unit 1A may complete the measurement of the device interval. On the other hand, upon receipt of the response data 1102 indicated in FIG. 11, the external peripheral device 2A reads out the measurement result of the device interval at a step 905 of FIG. 9. As a result, the external peripheral device 2A forms request data 1201 shown in FIG. 12, transmits this request data 1201 to the CPU unit 1A at a step 906, and is brought into the waiting condition until the response data from the CPU unit 1A is received at a step 907. It should be noted that FIG. 12 represents a structure of data which is communicated with the CPU unit 1A after the response data 1102 shown in FIG. 11 is received by the external peripheral device 2A. Reference numeral 1201 shows a structure of request data sent from the external peripheral device 2A to the CPU unit 1A. Reference numeral 12011 indicates a request code for instructing to read the measurement result of the device interval. Reference numeral 1201 shows a structure of such response data indicative of completion of the measurement, which is sent from the CPU unit 1A to the external peripheral device 2A in response to the request data 1201. This response data is arranged by a value of 1 representative of completion of the measurement, and the measurement result 12021 of the device interval. Reference numeral 1203 shows a structure of response data which is sent from the CPU unit 1A to the external peripheral device 2A in response to the request data 1201, and represents that the device interval is under measurement. This response data is arranged by a value of 0 indicative of being under measurement.

Figure 14:
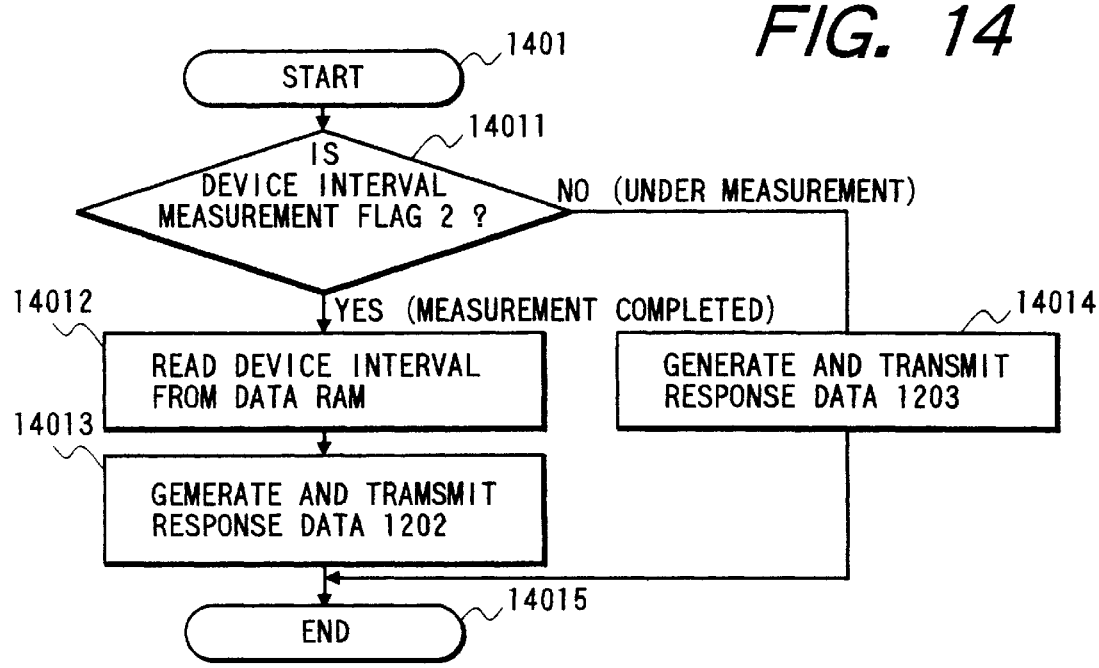

Operations of the CPU unit 1A when the request data 1201 issued from the external peripheral device 2A is received will now be described with reference to a flow chart shown in FIG. 1 to FIG. 3 and FIG. 14. FIG. 14 is such a flow chart for explaining the device interval time reading process operation 305 which is additionally provided in FIG. 3 in order to measure the device interval. This flow chart represents the process operations of the CPU unit 1A when the request data 1201 shown in FIG. 12 is sent. First, the CPU unit 1A receives the request data 1201 of FIG. 12 in the communication process 2031 with the external peripheral device shown in FIG. 2. Then, in the process 301 shown in FIG. 3, the process operation is branched to the device interval time reading process 305 in accordance with the request code 12011 of FIG. 12. In this process 305, the process operation shown in FIG. 14 is started to be performed at a step 1401. At a process 14011, a check is done as to whether or not the content of the device interval measuring flag area 5013 of FIG. 5 is equal to 2, namely the measurement of the device interval is completed. If YES, then the value is read out from the device interval measuring result area 5015 of FIG. 5 at a process 14012. At a process 14013, response data of FIG. 12 which indicates completion of the measurement is formed, and then transmitted to the external peripheral device 2A. For instance, when the value stored into the device interval measuring result area 5015 of FIG. 5 is equal to 30, such a value of 30 is transmitted which corresponds to the device interval time 12021 of the response data 1202. When the measurement of the device interval is not yet completed, the process operation is branched from the process 14011 to the process 14014, at which response data 1203 of FIG. 12 which indicates that the interval is under measurement is produced. This response data is sent to the external peripheral device 2A, and this process operation is ended at a step 14015.

On the other hand, in the external peripheral device 2A, a check is done at a step 908 of FIG. 9 as to whether or not the response data received from the CPU unit 1A corresponds to the response data 1202 for indicating completion of the measurement shown in FIG. 12. That is, whether or not the head of the response data corresponds to a value of 1. If YES, then at a step 909, the device interval measurement result 12021 contained in the response data 1202 is displayed in the measurement result display area 1601 on the display screen as shown in FIG. 16. At a step 910, the user can read out the measurement result of the device interval from the screen of the external peripheral device 2A. Also, when it is so judged at the step 908 that the response data 1203 indicative of being under measurement shown in FIG. 12 is received, the request data 1201 is again transmitted to the CPU unit 1A until the response data 1202 indicative of completion of the measurement is received, so that the process operations until the response data 1202 is received are repeated.

As previously described, in accordance with Embodiment 1 of the present invention, the process operation for measuring the device interval is previously prepared and stored into the system ROM 12A of the CPU 1A. Accordingly, the user need not perform a cumbersome operation such as adding that the sequence program for measuring the device interval, but can quickly measure the device interval.

EMBODIMENT 2

Next, a method for measuring the process time of the designated section in the sequence program, as one example of the internal conditions of the CPU unit 1A will now be explained with reference to FIGS. 1 to 3, FIG. 5, and FIGS. 17 to 25.

FIG. 17 shows one example of the sequence program indicated by a list, which is stored in the sequence program memory 11 of FIG. 1. In this drawing, the left side indicates steps 1701, and the right side represents sequence program commands 1702 described for the respective steps 1701. It should be noted in this embodiment that this measurement is carried out from 100 to 150 of the steps 1701 in the sequence program shown in FIG. 17.

Figure 18:
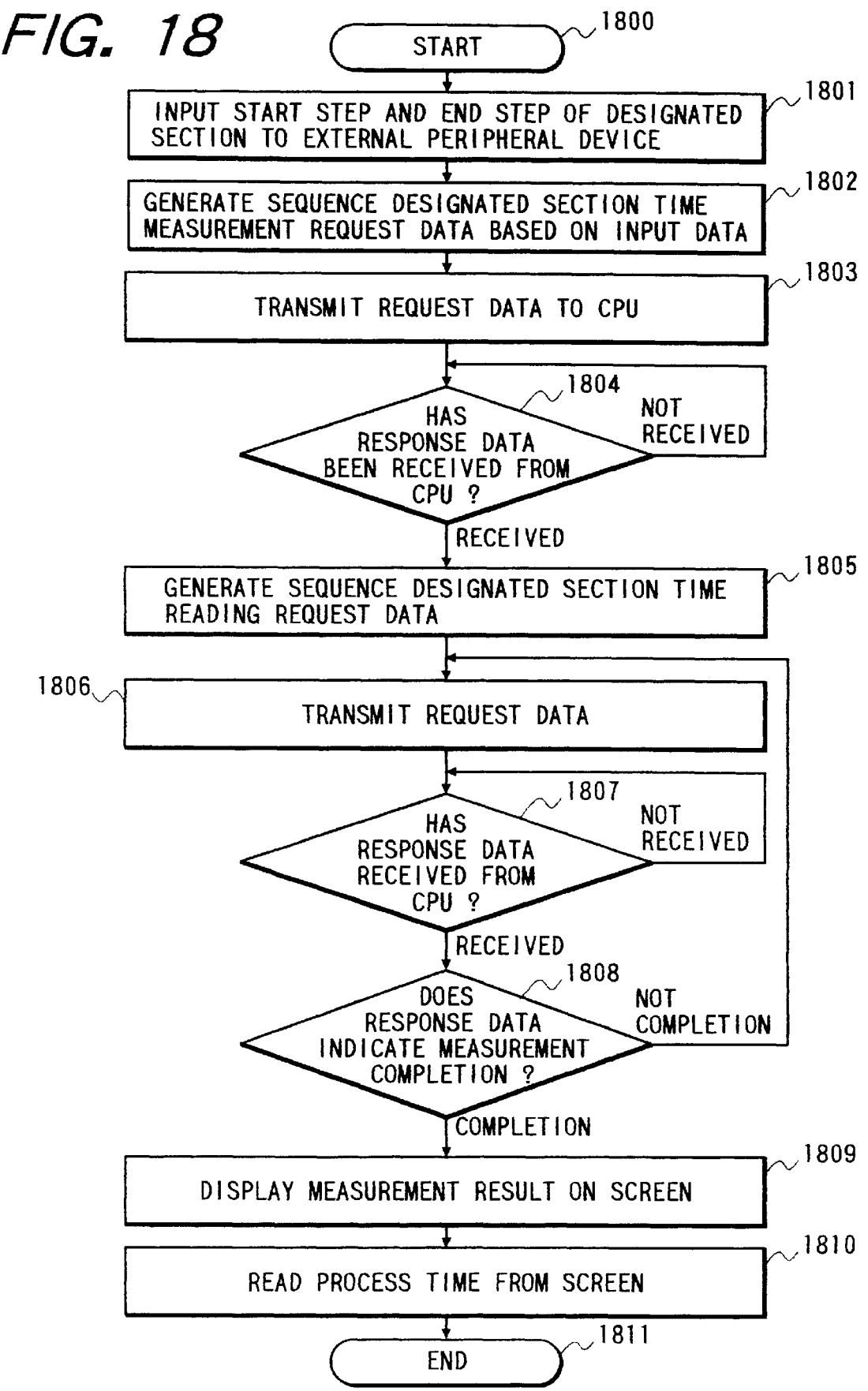
FIG. 18 is a flow chart showing user operations and a process performed by the external peripheral device in Embodiment 2 of the invention.

FIG. 18 is a flow chart for explaining a sequence of measuring the process time of the designated section according to Embodiment 2 of the present invention. In this flow chart, steps 1801 and 1810 indicate user's operation for the external peripheral device 2A, and steps 1802 to 1809 represent processed contents by the external peripheral device 2A, which will be described in detail.

In accordance with the flow chart of FIG. 18, operations when the process time of the designated section in the sequence program is measured will now be explained with reference to FIG. 1 to FIG. 3, FIG. 5, and FIG. 17 to FIG. 25. The sequence program shown in FIG. 17 is sequentially executed in the sequence process 202 of FIG. 2 from the zero step to the 1000 step corresponding to the FEND command. In case that the process time is measured when the process operations of the sequence program defined from the 100 step to the 150 step, the process operation at a step 1800 of FIG. 18 is commenced. Then, at a step 1801, the user enters the starting step and the end step of the designated section to be measured via the keyboard 2a under such a condition that the screen shown in FIG. 19 is displayed in the external peripheral device 2A of FIG. 1. FIG. 19 shows an example of a screen displayed on the external peripheral device 2A when the process time of the designated section is measured. In this drawing, reference numeral 1901 indicates an area for inputting therein the starting step of the designated section to be measured. Reference numeral 1902 denotes an area for entering therein the end step of the designated section. In this example of FIG. 19, the user enters 100 as the starting step, and 150 as the end step. This implies that the process time defined from the 100 step to the 150 step of the sequence program shown in FIG. 17 is measured.

Figure 20:
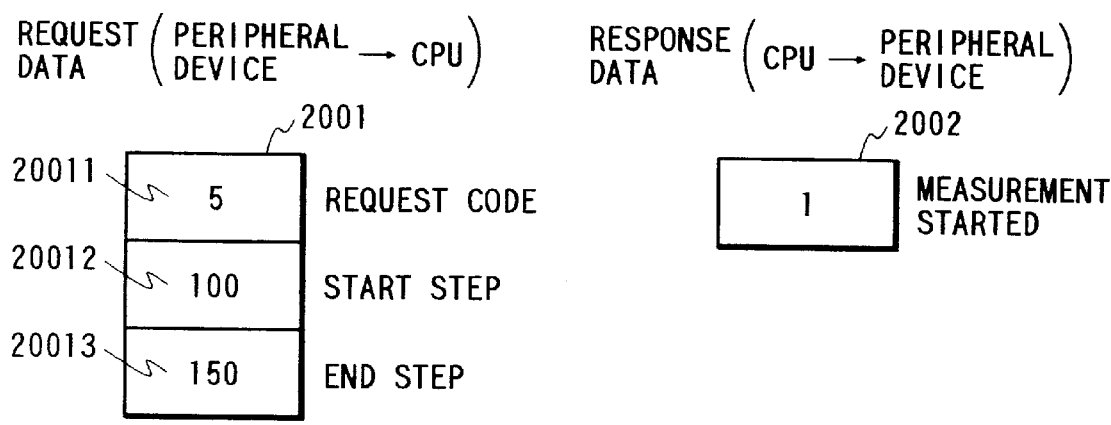
FIGS. 20 and 21 illustrate structures of data exchanged between the external peripheral device and the CPU unit in Embodiment 2 of the invention.

When the above-described data have been inputted, the process operation is advanced to the next step 1802. At this step, the external peripheral device 2A of FIG. 1 forms request data 2001 shown in FIG. 20 based on the inputted data. Here, FIG. 20 represents a structure of data communicated between the external peripheral device 2A and the CPU unit 1A after the data setting operation as shown in FIG. 19 is carried out by the external peripheral device 2A. In FIG. 20, reference numeral 20011 shows a structure of request data sent from the external peripheral device 2A to the CPU unit 1A, reference numeral 20012 indicates a starting step of the designated section, and reference numeral 20013 denotes an end step of the designated section. Reference numeral 2002 is a structure of response data transmitted from the CPU unit 1A to the external peripheral device 2A in response to the request data 2001. In case of FIG. 19, the command code 20011 becomes 5 indicative of a request to measure the process time of the designated section, the starting step 20012 becomes 100, and the end step 20013 becomes 150. Next, at a step 1803, this request data 2001 is transmitted to the CPU unit 1A, and at a step 1804, the process operation is brought into the waiting condition until the response data issued from the CPU unit 1A is received.

Figure 22:
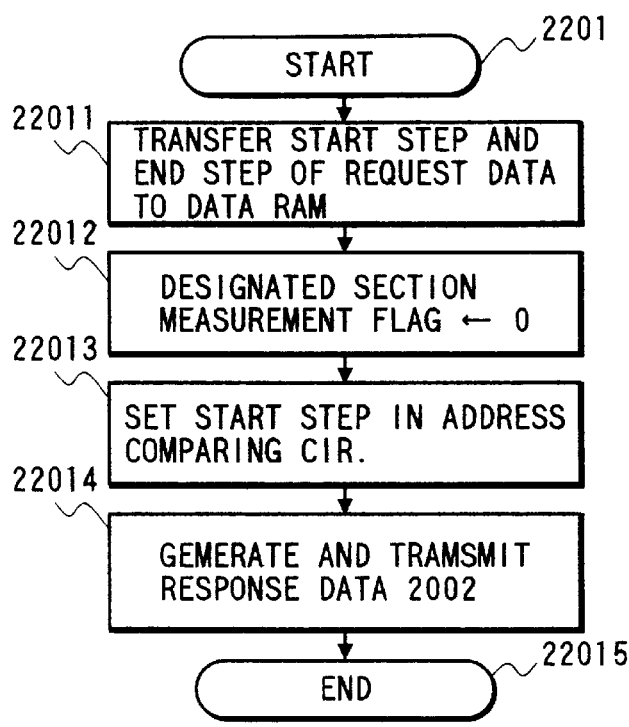
FIGS. 22 and 23 are flow charts showing a process performed by the CPU unit in response to a request for measuring a sequence designated section process time issued from the external peripheral device in Embodiment 2 of the invention.

Now, a description will be made of operations of the CPU unit 1A when the request data 2001 is received from the external peripheral device 2A with reference to FIG. 1 to FIG. 3 and a flow chart of FIG. 22. First, the CPU unit 1A which is executing the main program execution process 201 shown in FIG. 2 accepts the request data 2001 in the communication process 2031 with the external peripheral device 2A of FIG. 2, and the process operation is branched to the process time measurement request process 306 for the designated section in accordance with the request code 20011 in the process 301 shown in FIG. 3. In this process 306, the process operation shown in a step 2201 of FIG. 22 is executed. In the first process 22011, the starting step 20012 of FIG. 20 is stored into the starting step area 5021 of the data RAM 13A of FIG. 5, whereas the end step 20013 of FIG. 20 is stored into the end step area 5022 of the data RAM 13A of FIG. 5. In a process 22012, a value of 0 which indicates that the process time measurement request of the designated section is issued is stored into the designated section measuring flag area 5023 of the data RAM 13A of FIG. 5. At the next process 22013, the value 100 of the starting step area 5021 of FIG. 5 is set to the address comparing circuit 18 of FIG. 1. Finally, at a process 22014, the CPU unit 1A forms such response data 2002 for indicating that the process time measuring request process of the designated section is completed. Then, the CPU unit 1A transmits this response data to the external peripheral device 2A, and the process operation is ended at a step 22015.

After the above-described process operations have been carried out, the CPU unit 1A executes the process operation subsequent to the special unit service process 2032 shown in FIG. 2, and then again executes the sequence process 202. While this sequence process 202 is executed, when the step designated by the starting step 20012 of FIG. 20 is executed, namely the instruction at the 100th step is executed, the address comparing circuit 18 of FIG. 1 issues an interrupt signal to the CPU 10. When this interrupt signal is received, the CPU 10 interrupts the execution of the sequence process 202 of FIG. 2, and the process operation is advanced to the interrupt process 2401 shown in FIG. 24.

In this interrupt process operation 2401, a check is done at a process 24011 as to whether or not the content of the designated section measuring flag area 5023 is equal to 0. Since the present content is equal to 0, the process operation is branched to the next process 24012. At the next process 24012, the present value of the internal timer 21A shown in FIG. 1 is stored into the starting time area 5024 of FIG. 5. At the subsequent process 24013, a value of 151 which is obtained by adding 1 to the value of 150 stored in the end step area 5022 of FIG. 5 is set to the address comparing circuit 18 of FIG. 1. The reason why the value of 1 is added to the end step is to measure the process time just before the next 151 step is executed and the processes up to the 150 step are performed. At a process 24014, a value of 1 indicative of the measurement start is stored into the designated section measuring flag area 5023 of FIG. 5, whereby the interrupt process is completed.

Upon completion of this interrupt process 2401, the CPU 10 restarts the execution of the main program at the step where the sequence program 202 of FIG. 2 is interrupted. Subsequently, when the step set to the address comparing circuit 18 of FIG. 1, namely the 151 step of the end step plus 1 is executed, the address comparing circuit 18 of FIG. 1 produces the interrupt signal. As a result, the CPU 10 interrupts the execution of the sequence program 202, and then the process operation is advanced to the interrupt process 2401.

In the interrupt process 2401, since the content of the designated section measuring flag 5023 of FIG. 5 is equal to 1 at this time, and also the judged result is made at the process 24011, the process operation is branched to the process 24015. At this step, the value stored in the starting time area 5024 of FIG. 5 is subtracted from the present value of the internal timer 21A shown in FIG. 1, and the subtraction result is stored into the designated section measuring result area 5025 of FIG. 5. When the resultant subtracted time is, for example 8 msec, a value of 8 is stored into the designated section measuring time area 5025 of FIG. 5. Finally, a value of 2 indicative of completion of measurement is stored into the designated section measuring flag 5023 of FIG. 5 at a process 24016, and then the interrupt process is accomplished at a step 24018.

Figure 21:
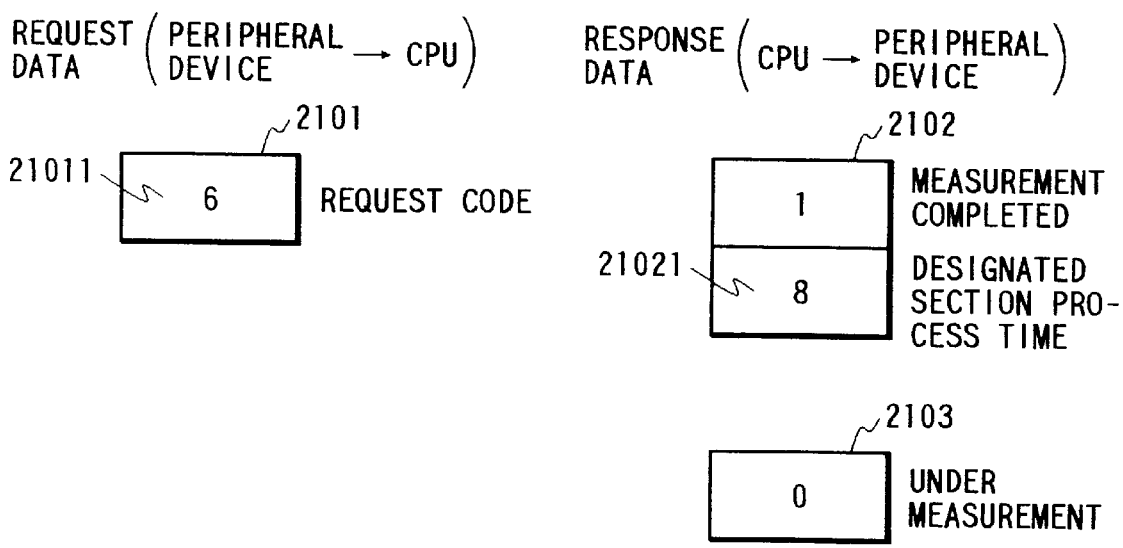

A series of the above-described process operations has been completely accomplished, so that the CPU unit 1A may complete the measurement of the process time of the designated section. On the other hand, upon receipt of the response data 2002 indicated in FIG. 20, the external peripheral device 2A reads out the measurement result of the process time of the designated section at a step 1805 of FIG. 18. As a result, the external peripheral device 2A forms request data 2101 shown in FIG. 21, transmits this request data 2101 to the CPU unit 1A at a step 1806, and is brought into the waiting condition until the response data from the CPU unit 1A is received at a step 1807. It should be noted that FIG. 21 represents a structure of data which is communicated with the CPU unit 1A after the response data 2002 shown in FIG. 20 is received by the external peripheral device 2A. Reference numeral 2101 shows a structure of request data sent from the external peripheral device 2A to the CPU unit 1A. Reference numeral 21011 indicates a request code for instructing to read the measurement result of the process time for the designated section. Reference numeral 2102 shows a structure of such response data indicative of completion of the measurement, which is sent from the CPU unit 1A to the external peripheral device 2A in response to the request data 2101. Reference numeral 21021 shows a measurement result of the process time for the designated section. Reference numeral 2103 shows a structure of response data which is sent from the CPU unit 1A to the external peripheral device 2A in response to the request data 2101, and represents that the process time for the designated section is under measurement.

Figure 23:
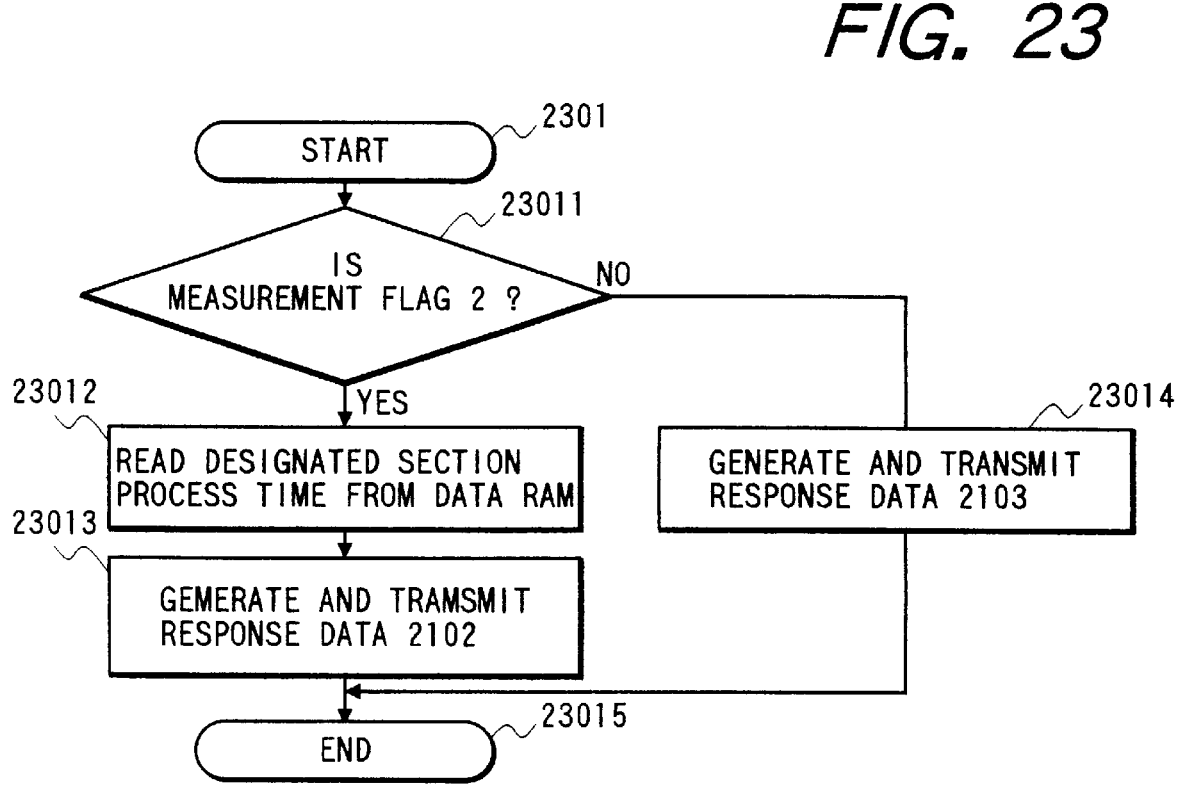
Figure 24:
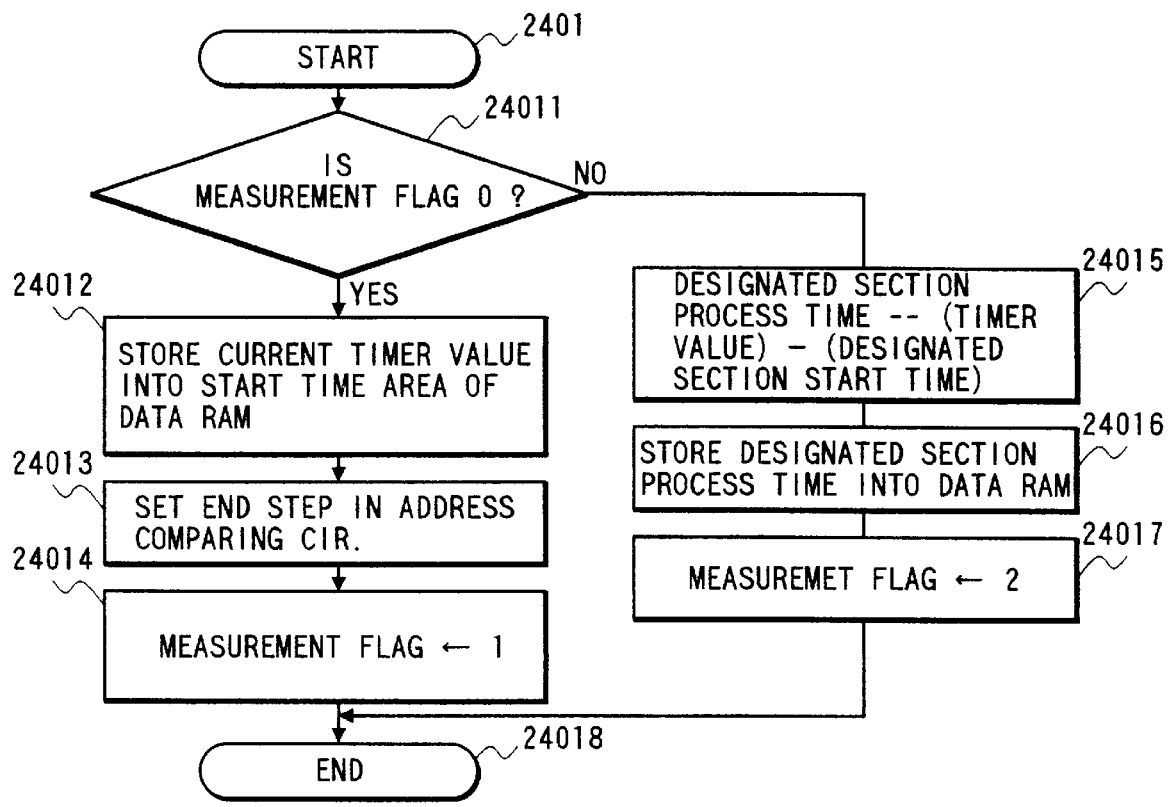
FIG. 24 is a flow chart showing an interrupt process from an address comparing circuit in Embodiment 2 of the invention.

Operations of the CPU unit 1A when the request data 2101 issued from the external peripheral device 2A is received will now be described with reference to a flow chart shown in FIG. 1 to FIG. 3 and FIG. 23. First, the CPU unit 1A receives the request data 2001 of FIG. 20 in the communication process 2031 with the external peripheral device shown in FIG. 2. Then, in the process 301 shown in FIG. 3, the process operation is branched to the process 307 for reading the process time of the designated section shown in FIG. 3. In this process 307, the process operation shown in FIG. 23 is started. At a process 23011, a check is done as to whether or not the content of the designated section measuring flag area 5023 of FIG. 5 is equal to 2, namely the measurement of the process time for the designated section is completed. If YES, then the value is read out from the designated section process time area 5025 of FIG. 5 at a process 23012. At a process 23013, response data 2102 of FIG. 12 which indicates completion of the measurement is formed, and then transmitted to the external peripheral device 2A. For instance, when the value stored into the designated section process time area 5025 of FIG. 5 is equal to 8, such a value of 8 is transmitted which corresponds to the designated section process time 21021 of the response data 2102. When the measurement of the designated section process time is not yet completed, the process operation is branched from the process 23011 to the process 23014, at which response data 2103 of FIG. 21 which indicates that the section process time is under measurement is produced. This response data is sent to the external peripheral device 2A, and this process operation is ended at a step 23015.

Figure 25:
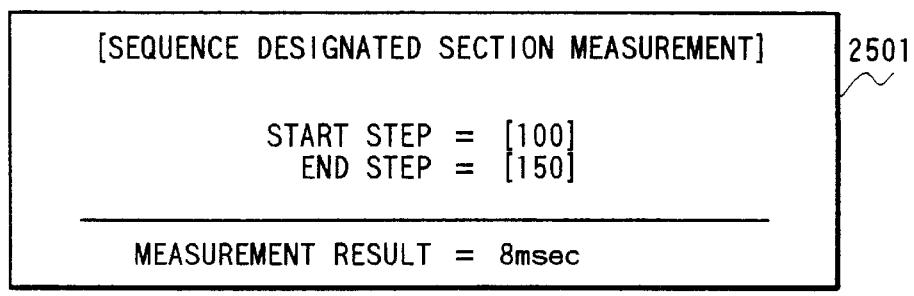
FIG. 25 illustrates an example of a displayed picture of a measurement result in the external peripheral device in Embodiment 2 of the invention.

On the other hand, in the external peripheral device 2A, a check is done at a step 1808 as to whether or not the response data received from the CPU unit 1A corresponding to the response data 2102 indicates completion of the measurement shown in FIG. 21. If YES, then at a step 1809, the process time 21021 of the designated section contained in the response data 2102 is displayed in the measurement result display area 2501 on the display screen as shown in FIG. 25. At a step 1810, the user can read out the measurement result of the process time for the designated section from the screen of the external peripheral device 2A. Also, when it is so judged that the response data 2103 indicative of being under measurement shown in FIG. 21 is received, the request data 2101 is again transmitted to the CPU unit 1A until the response data 2101 indicative of completion of the measurement is received, so that the process operations until the response data 2102 is received are repeated.

As described above, in accordance with Embodiment 2 of the present invention, the process operation for measuring the process time of the designated section is previously prepared and stored into the system ROM 12A of the CPU 1A. Accordingly, the user need not perform such a cumbersome operation as adding the program for measuring the designated section of the sequence program, but can quickly measure the process time of the designated section. Conventionally, two sets of the address comparing circuit 18 are employed to measure the designated section. However, according to this embodiment, it can be realized by employing only one address comparing circuit, so that H/W of PC can be made simple at low cost.

EMBODIMENT 3

Referring now to FIGS. 1 to 3, FIG. 5, and FIGS. 26 to 29, a description will be made as to a method for measuring accumulated execution time of the interrupt program, corresponding to one example of the internal conditions of the CPU unit 1A.

FIG. 26 is a flow chart for explaining a means for measuring the accumulated execution time of the interrupt program according to Embodiment 3 of the present invention. In this flow chart, steps 2601 and 2606 indicate operation by the user for the external peripheral device 2A, and a step 2602 through a step 1605 represent the process contents of the external peripheral device 2A, a detailed description of which will now be made.

Operations when the accumulated execution time of the interrupt program is measured in accordance with one embodiment of the present invention will now be explained using FIG. 1, FIG. 2 and FIG. 5. First, in FIG. 2, the CPU unit 1A of FIG. 1 commences the main program execution process 201. Before the sequence process 202 is executed, 0 is stored in the program accumulated time area 5032 of the data RAM 13A of FIG. 5 at a process 2014. Then, when an interrupt aspect happens to occur while executing the sequence process 202, the interrupt program execution process 204 is executed. At a process 2043, the present value of the internal timer 21A is stored in the interrupt program starting time area 5031 of the data RAM 13A of FIG. 5. Then, after the conventional interrupt program execution processes 5141 to 5144 have been performed, the value stored in the interrupt program process starting time area 5031 of FIG. 5 is subtracted from the present time of the internal timer 21A of FIG. 1. The subtraction result is added with a value stored into the interrupt program accumulated time area 5032 of FIG. 5. Then, the addition result is stored into the accumulated execution time area 5032 for the interrupt program of FIG. 5.

While the sequence process 202 of FIG. 2 is executed, the process time required for a single interrupt program 204 is added to the accumulated execution time area 503 of the interrupt program 204 of FIG. 5 every time the interrupt program is executed. When the execution of the sequence process is ended, total process time data of the interrupt program is stored into the accumulated execution time area 5032 of the interrupt program 204 of FIG. 5. As a result, the CPU 1A may complete the measurement of the accumulated execution time of the interrupt program 204 which is executed during a single sequence process.

Thus, operations for reading the accumulated execution time of the interrupt program 204 measured by the CPU unit 1A by the user will now be described with reference to FIG. 26. At a first step 2600, the process operation is commenced. At a step 2601, the user instructs the external peripheral device 2A to monitor the accumulated execution time through the keyboard 2a of the external peripheral device 2A. The external peripheral device 2A which has received this instruction produces request data 2701 shown in FIG. 27 so as to read the accumulated execution time of the interrupt program at a step 2602. At a step 2603, the external peripheral device 2A sends the request data 2701 to the CPU unit 1A and waits for the reception of the response data from the CPU unit 1A. It should be noted that FIG. 27 shows a structure of data communicated with the CPU unit 1A in order that the external peripheral device 2A reads out the measurement result of the accumulated execution time of the interrupt program from the CPU unit 1A. Reference numeral 2701 shows a structure of request data sent from the external peripheral device 2A to the CPU unit 1A, reference numeral 27011 indicates a request code for instructing the readout of the accumulated execution time of the interrupt program. Reference numeral 2702 shows a structure of response data sent from the CPU unit 1A to the external peripheral device 2A to the request data 2701. Reference numeral 27021 is a measurement result of the accumulated execution time of the interrupt program.

Figure 28:
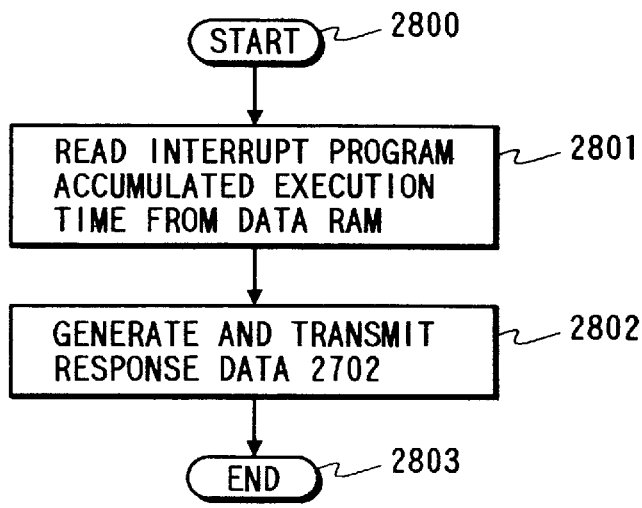
FIG. 28 is a flow chart showing a process performed by the CPU unit in response to an interrupt program accumulated execution time reading request in Embodiment 3 of the invention.

Now, a description will be made of operations of the CPU unit 1A when the request data 2701 is received from the external peripheral device 2A with reference to FIG. 1 to FIG. 3 and flow charts of FIG. 5 and FIG. 28. FIG. 28 is a flow chart for explaining the process operation 308 for reading the interrupt program accumulated execution time added in FIG. 3 so as to measure the accumulated execution time of the interrupt program, which represents the process operations of the CPU unit 1A when the request data 2701 is sent. First, the CPU unit 1A accepts the request data 2701 of FIG. 27 in the communication process 2031 with the external peripheral device 2A of FIG. 2, and the process operation is branched to the accumulated execution time reading process 308 for the interrupt program in accordance with the request code 25011 in the process 301 shown in FIG. 3. In this process 308, the process operation 2800 shown in FIG. 28 is executed. At a process 2801, the value is read out from the accumulated execution time area 5032 of the interrupt program of FIG. 5. At a process 2801, the response data 2702 indicated in FIG. 27 is formed and is transmitted to the external peripheral device 2A. For instance, when the accumulated execution time of the interrupt program is 5 msec, a value of 5 is stored into the interrupt program accumulated execution time area 5032 of FIG. 5, and then the value of 5 is transmitted as the interrupt program accumulated execution time 27021 of the response data 2702. Then, the process operation is ended at a step 2803.

Figure 29:
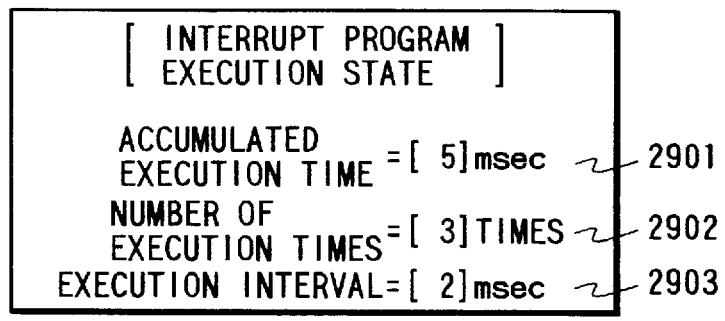
FIG. 29 illustrates an example of a displayed picture of a measurement result in the external peripheral device in Embodiment 3 of the invention.

On the other hand, when the response data of FIG. 27 issued from the CPU unit 1A is received in the external peripheral device 2A, the interrupt program accumulated execution time indicated by the response data 2702 is displayed in the accumulated execution time measurement result display area 2901 of the interrupt program on the display screen as illustrated in FIG. 29 at a step 2605. At the next step 2606, the user can grasp the measurement result of the accumulated execution time for the interrupt program from the screen of the external peripheral device 2A.

As described above, in accordance with Embodiment 3 of the present invention, the process operation for measuring the accumulated execution time of the interrupt program is previously prepared and stored into the system ROM 12A of the CPU 1A. Accordingly, the user need not perform such a cumbersome operation as adding the sequence program for measuring the accumulated execution time of the interrupt program, but can quickly measure the accumulated execution time of the interrupt program.

EMBODIMENT 4

Next, a method for measuring the process time of the END process, as one example of the internal conditions of the CPU unit 1A will now be explained with reference to FIGS. 1 to 3, FIG. 5, and FIGS. 30 to 32.

First, measuring the process time of the END process in the CPU unit 1A of FIG. 1 is realized by a similar manner to that for measuring the process time of a single interrupt program as shown in Embodiment 3. That is, before the END process 203 is executed in FIG. 2, the present value of the internal timer 21A of FIG. 1 is stored into the END process starting time area 5041 of the data RAM 13A shown in FIG. 5 at a process 2016. After the END process 203 is executed, the content of the END process starting time area 5041 of FIG. 5 is subtracted from the present value of the internal timer 21A of FIG. 1. The subtraction result is stored into the END process time area 5042 of the data RAM 13A of FIG. 5. For instance, when the END process time obtained from the subtraction is 5 msec, a value of 5 is stored into the END process time area 5042 of FIG. 5.

Figure 30:
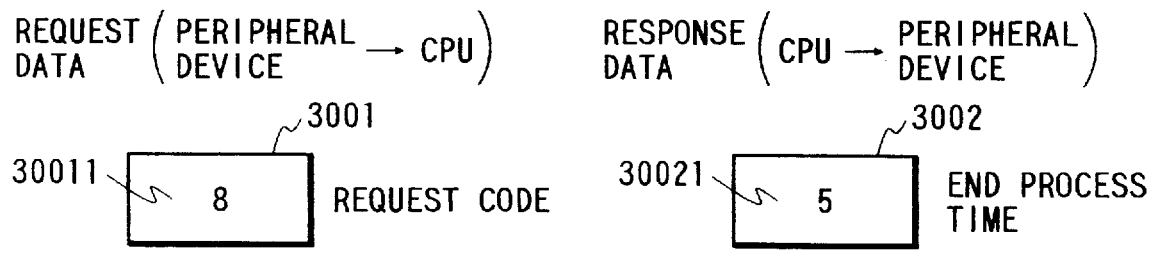
FIG. 30 illustrates a structure of data exchanged between the external peripheral device and the CPU unit in Embodiment 4 of the invention.

The above-described process operations are completed, so that the CPU unit 1A accomplishes the measurement of the END process time one time. Similar to Embodiment 3, the user instructs the external peripheral device 2A to monitor the END process time from the keyboard 2a of the external peripheral device 2A of FIG. 2 so as to read out this measurement result. Accordingly, the external peripheral device 2A transmits the request data 3001 for reading the END process time shown in FIG. 30 to the CPU unit 1A. Now, FIG. 30 shows a structure of data communicated with the CPU unit 1A in order that the external peripheral device 2A reads out the measurement result of the END process time measured by the CPU unit 1A. Reference numeral 3001 shows a structure of request data sent from the external peripheral device 2A to the CPU unit 1A. Reference numeral 3011 is a request code for instructing the readout of the END process time. Reference numeral 3002 is a structure of response data sent from the CPU unit 1A to the external peripheral device 2A in response to the request data 3001. Reference numeral 30021 denotes the measurement result of the END process time.

Figure 31:
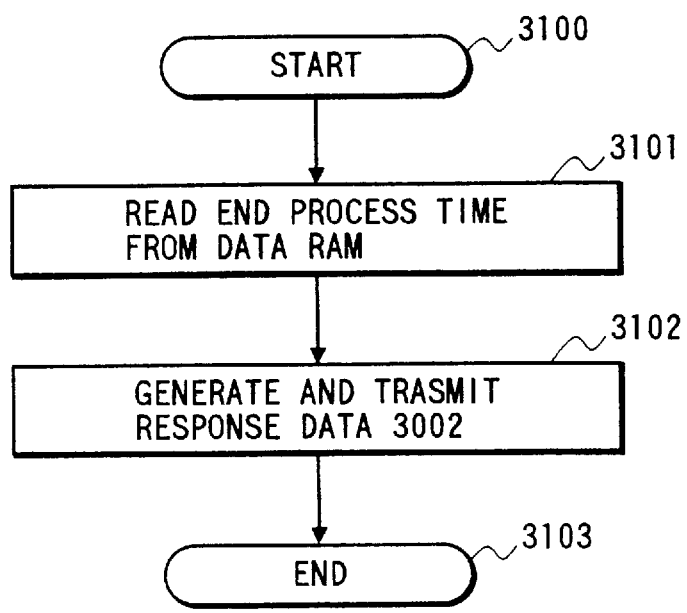
FIG. 31 is a flow chart showing a process performed by the CPU unit in response to an END process time reading request from the external peripheral device in Embodiment 4 of the invention.
Figure 32:
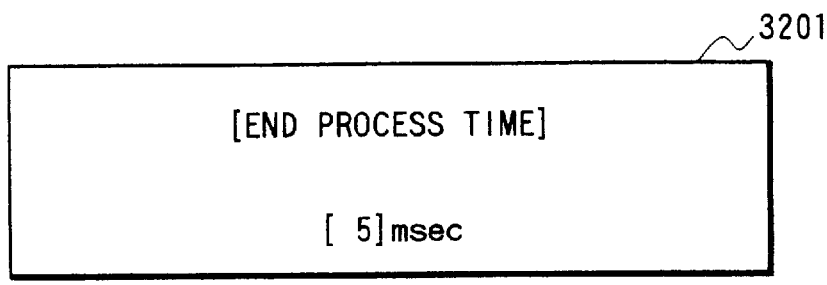
FIG. 32 illustrates an example of a displayed picture of a measurement result in the external peripheral device in Embodiment 4 of the invention.

The CPU unit 1A receives the request data 3001 of FIG. 3 in the communication process 2031 with the external peripheral device shown in FIG. 2. At the process 301 shown in FIG. 3, the process operation is branched to an END process time reading process 309 in response to the request code 3001. At a process 309, a process operation 3100 shown in FIG. 31 is executed. At a process 3101, the measurement result is read from the END process time area of data RAM 13A of FIG. 5. At a process 3102, response data 3002 is formed from the read measurement result, and the formed response data 3002 is transmitted to the external peripheral device 2A of FIG. 2. Then, the process operation is ended at a step 3103. When the measured END process time is for instance 5 msec, a value of 5 is transmitted as the END process time 30031 of the response data 3002. On the other hand, the external peripheral device 2A of FIG. 2 which has received this response data 3002 displays the END process time 30021 of the response data 3002 on the END process time display area 3201 of the screen as shown in FIG. 32. Thus, the user can recognize the measurement result of the END process time from the screen of the external peripheral device 2A.

As described above, in accordance with Embodiment 5 of the present invention, the process operation for measuring the process time of the END process 203 is previously prepared and stored into the system ROM 12A of the CPU 1A. Accordingly, the user need not perform such a cumbersome operation as adding the sequence program for measuring the END process, but can quickly measure the device interval. Also, since the END process time can be monitored by the external peripheral device 2A, the logic analyzer 20 is no longer required as the external measuring device.

EMBODIMENT 5

Next, a method for measuring the process time of the special unit service process 2032 of FIG. 2, as one example of the internal conditions of the CPU unit 1A will now be explained with reference to FIGS. 1 to 3, FIG. 5, and FIGS. 33 to 36.

First, measuring the process time of the special unit service process in the CPU unit 1A of FIG. 1 is realized by a similar manner to that for measuring the process time of a single interrupt program as shown in Embodiment 3. That is, in the special unit service process 2032 of FIG. 2, a judgement is made at a process 3301 of FIG. 33 as to whether or not a process request is issued from the special function unit 5 of FIG. 1. If YES, then the present value of the internal timer 21A of FIG. 1 is stored into the special unit service process starting time area 5051 of the data RAM 13A of FIG. 5 at a process 3304. At the next process 3305, the actual special unit service process is executed in response to the process request from the special function unit 5 of FIG. 1. At a process 3306, the content of the special unit service process starting time area 5051 of FIG. 5 is subtracted from the present value of the internal timer 21A of FIG. 1. The subtraction result is stored in the special unit service process time area 5052 of the data RAM 13A of FIG. 5. For instance, when the measured process time becomes 1 msec with respect to the process request issued from a certain special unit, a value of 1 is stored into the special service unit service process time area 5052.

Figure 34:
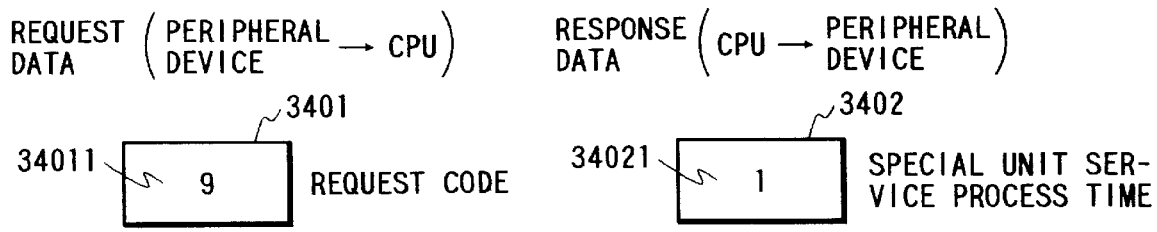
FIG. 34 illustrates a structure of data exchanged between the external peripheral device and the CPU unit in Embodiment 5 of the invention.

The above-described process operations are completed, so that the CPU unit 1A accomplishes the measurement of the special unit service process time one time. Similar to Embodiment 3, the user instructs the external peripheral device 2A of FIG. 1 to monitor the special unit service process time from the keyboard 2a of the external peripheral device 2A so as to read out this measurement result. Accordingly, the external peripheral device 2A transmits the request data 3401 for reading the special unit service process time shown in FIG. 34 to the CPU unit 1A. Now, FIG. 34 shows a structure of data communication with the CPU unit 1A in order that the external peripheral device 2A reads out the measurement result of the special unit service process time. Reference numeral 3401 shown 2 structure of request data sent from the external peripheral device 2A to the CPU unit 1A. Reference numeral 34011 is a request code for instructing the readout of the measurement result of the special unit service process time. Reference numeral 3402 is a structure of response data sent from the CPU unit 1A to the external peripheral device 2A in response to the request data 3401. Reference numeral 34021 denotes the measurement result of the special unit service process time.

Figure 35:
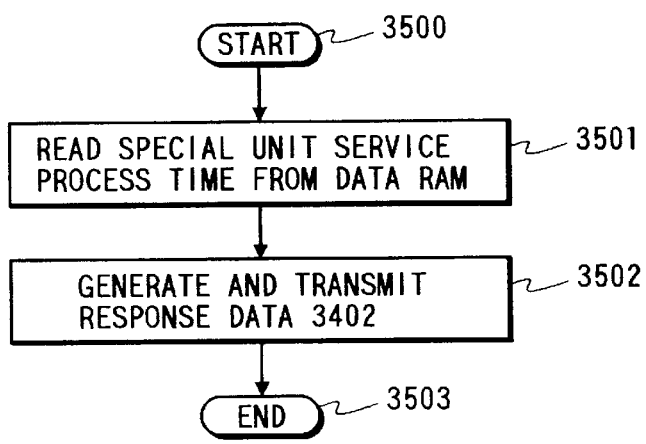
FIG. 35 is a flow chart showing a process performed by the CPU unit in response to a special unit service process time reading request from the external peripheral device in Embodiment 5 of the invention.
Figure 36:
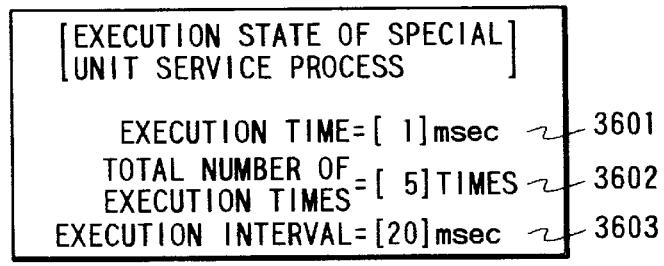
FIG. 36 illustrates an example of a displayed picture of a measurement result in the external peripheral device in Embodiment 5 of the invention.

The CPU unit 1A subsequently receives the request data 3401 in the communication process 2031 with the external peripheral device shown in FIG. 2. At the process 301 shown in FIG. 3, the process operation is branched to a special unit service process time reading process 310 in response to the request code 3401. At a process 310, a process operation 3500 shown in FIG. 35 is executed. At a process 3501, the measurement result is read from the special unit service process time area 5052 of the data RAM 13A of FIG. 5. At a process 3502, response data 3402 shown in FIG. 34 is formed from the read measurement result, and the formed response data 3402 is transmitted to the external peripheral device 2A of FIG. 2. When the measured special unit service process time is for instance 1 msec, a value of 1 is transmitted as the special unit service process time 34021 of the response data 3402. Then, the process operation is ended at a step 3503. The external peripheral device 2A of FIG. 2 which has received this response data 3402 displays the special unit service process time 34021 of the response data 3402 on the special unit service process time display area 3601 of the screen as shown in FIG. 36. Thus, the user can recognize the measurement result of the special unit service process time from the screen of the external peripheral device 2A. It should be noted in FIG. 36, both of the total execution number display area 3602 for the special unit service process and also the execution interval display area 3603 for the special unit service process correspond to an area for representing the measurement result of the internal conditions of the CPU unit 1A according to another embodiment of the present invention, a detailed operation of which will be explained with reference to the following embodiments.

As described above, in accordance with Embodiment 5 of the present invention, the process operation for measuring the process time of the special unit service process 2032 is previously prepared and stored into the system ROM 12A of the CPU 1A. Accordingly, the user need not odd such a sequence program for measuring the special unit service process time. Also, in the prior art, the measurement is carried out for both the END process time when no processing request is issued from the special function unit 5, and the END process time when the processing request is issued from the special function unit 5, and then the special unit service process time is calculated. Since such a cumbersome process operation is not required in Embodiment 5, the special unit service process time can be quickly and easily measured.

EMBODIMENT 6

Next, a method for measuring the execution number of the interrupt program, as one example of the internal conditions of the CPU unit 1A will now be explained with reference to FIGS. 1 to 3, FIG. 5, FIG. 29, and FIGS. 37 to 38.

First, in the main program execution process 201 of FIG. 2, the CPU unit 1A stores 0 into the interrupt program execution number area 506 of the data RAM 13A shown in FIG. 5 at a process 2015. When the interrupt signal is transmitted from the interrupt producing circuit of FIG. 1 under execution of the sequence process 202, the execution of the sequence process 202 of FIG. 2 is interrupted and the interrupt execution process 204 is executed by the CPU unit 1A. In the interrupt program execution process 204, 1 is added to the content of the interrupt program execution number area shown in FIG. 5 at a process 2041. After the conventional interrupt program execution processes 5141 to 5144 have been executed, the execution of the interrupt program execution process 204 is completed at a step 5145, and also the sequence process 202 is again executed from the interrupted step.

As a result of executing the above-described process operations, while the sequence process 202 is performed, the content of the execution program execution number area 506 of the data RAM 13A of FIG. 5 is sequentially added with 1 every time the interrupt program is carried out. When the execution of the sequence process 202 is ended, a total number of executing the interrupt program is stored into the interrupt program execution number area 506 of FIG. 5. As a consequence, the measurement of the interrupt program execution number by the CPU unit 1A is accomplished, which has been executed within one execution of the sequence process.

Figure 37:
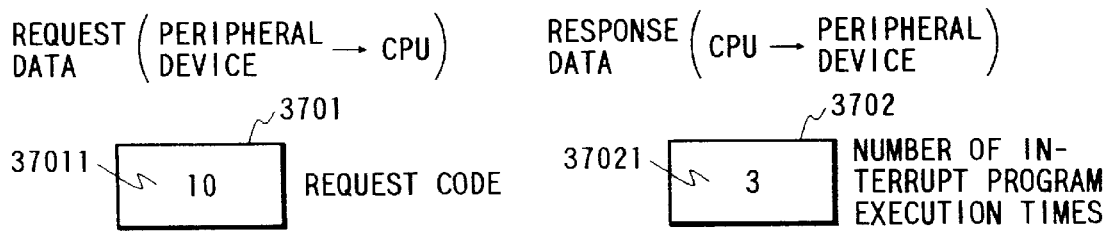
FIG. 37 illustrates a structure of data exchanged between the external peripheral device and the CPU unit in Embodiment 6 of the invention.

Subsequently, similar to Embodiment 3, the user instructs the external peripheral device 2A of FIG. 2 to monitor the interrupt program execution number from the keyboard 2a of the external peripheral device 2A of FIG. 2 so as to read out this measurement result of the interrupt program execution number measured by the CPU unit 1A. Accordingly, the external peripheral device 2A transmits the request data 3701 shown in FIG. 37 for reading the interrupt program execution number to the CPU unit 1A. Now, FIG. 37 shows a structure of data communicated with the CPU unit 1A in order that the external peripheral device 2A reads out the measurement result of the interrupt program execution number from the CPU unit 1A. Reference numeral 3701 shows a structure of request data sent from the external peripheral device 2A to the CPU unit 1A. Reference numeral 3711 is a request code for instructing the readout of the measurement result about the interrupt program execution number. Reference numeral 3702 is a structure of response data sent from the CPU unit 1A to the external peripheral device 2A in response to the request data 3701. Reference numeral 37021 denotes the measurement result of the interrupt program execution number.

Figure 38:
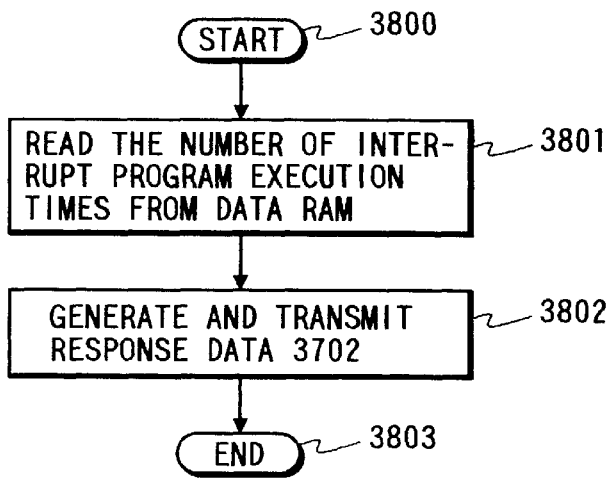
FIG. 38 is a flow chart showing a process of reading the number of interrupt program execution times in Embodiment 6 of the invention.

On the other hand, the CPU unit 1A receives the request data 3701 of FIG. 37 in the communication process 2031 with the external peripheral device shown in FIG. 2. At the process 301 shown in FIG. 3, the process operation is branched to an interrupt program execution number reading process 311 in response to the request code 37011 of the request data 3701. At a process 311, a process operation 3800 shown in FIG. 38 is executed. In this process 3800, the measurement result is read from the interrupt program execution number area 506 of the data RAM 13A of FIG. 5 at a first process 3801. At a process 3802, response data 3702 of FIG. 37 is formed from the read measurement result, and the formed response data 3702 is transmitted to the external peripheral device 2A of FIG. 2. Then, the process operation is ended at a step 3803. When the execution number of the interrupt program is, for instance, 3, a value of 3 is transmitted as the interrupt program execution number 37021 of the response data 3702. The external peripheral device 2A of FIG. 1 which has received this response data 3702 displays the interrupt program execution number 37021 of the response data 3702 on the interrupt program execution number display area 2902 of the screen as shown in FIG. 29. Thus, the user can recognize the measurement result of the interrupt program execution number from the screen of the external peripheral device 2A.

As described above, in accordance with Embodiment 6 of the present invention, the process operation for measuring the interrupt program execution number is previously prepared and stored into the system ROM 12A of the CPU 1A. Accordingly, the user need not add the sequence program for measuring interrupt program, but can quickly measure the execution number of the interrupt program.

EMBODIMENT 7

Next, a method for measuring the execution number of the special unit service process, as one example of the internal conditions of the CPU unit 1A will now be explained with reference to FIGS. 1 to 3, FIG. 5, FIG. 36, and FIGS. 39 to 40.

First, the CPU unit 1A of FIG. 1 commences the execution of the main program execution process 201 shown in FIG. 2. At a step 2013, 0 is stored into the special unit service process execution number area 507 of the data RAM 13A shown in FIG. 5. Then, in the special unit service process 2032, a process 3300 indicated in FIG. 33 is performed. At the next process 3301, a judgement is made as to whether or not a processing request is issued from the special unit. If such a processing request is issued, 1 is added to the content of the special unit service process execution number area 507 of FIG. at the next process 3302. As a consequence, while the main program execution process 201 of FIG. 2 is under execution, every time the special unit service actual process 3305 for the request issued from the special function unit 5 of FIG. 1 is executed at the special unit service process 2032, the content of the special unit service process execution number area 509 of FIG. 5 is sequentially added with 1. Thus, the CPU unit 1A of FIG. 1 can measure the execution number of the special unit service process.

Figure 39:
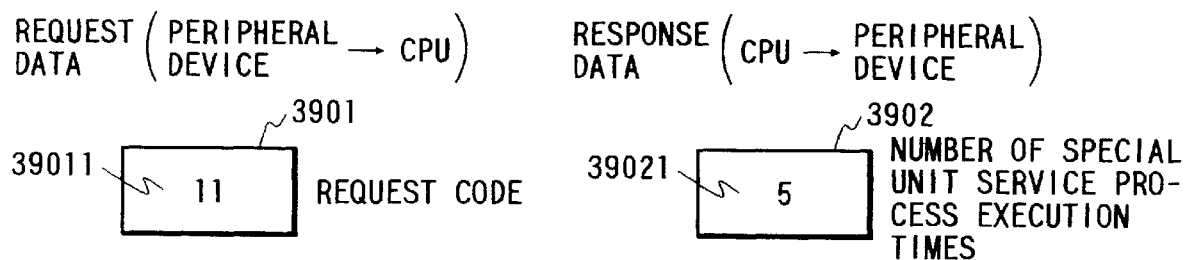
FIG. 39 illustrates a structure of data exchanged between the external peripheral device and the CPU unit in Embodiment 7 of the invention.

With the above-described process operations, the user may read the execution number of the special unit service process measured by the CPU unit 1A. Similar to Embodiment 3, the user instructs the external peripheral device 2A to monitor the special unit service execution number from the keyboard 2a of the external peripheral device 2A of FIG. 1 so as to read out this measurement result. Accordingly, the external peripheral device 2A transmits the request data 3901 for reading the special unit service process execution number to the CPU unit 1A. Now, FIG. 39 shows a structure of data communicated with the CPU unit 1A in order that the external peripheral device 2A reads out the measurement result of the special unit service process execution number from the CPU unit 1A. Reference numeral 3901 shows a structure of request data sent from the external peripheral device 2A to the CPU unit 1A. Reference numeral 39011 is a request code for instructing the execution number of the special unit service. Reference numeral 3902 is a structure of response data sent from the CPU unit 1A to the external peripheral device 2A in response to the request data 3901. Reference numeral 39021 denotes the measurement result of the special unit service process execution number.

Figure 40:
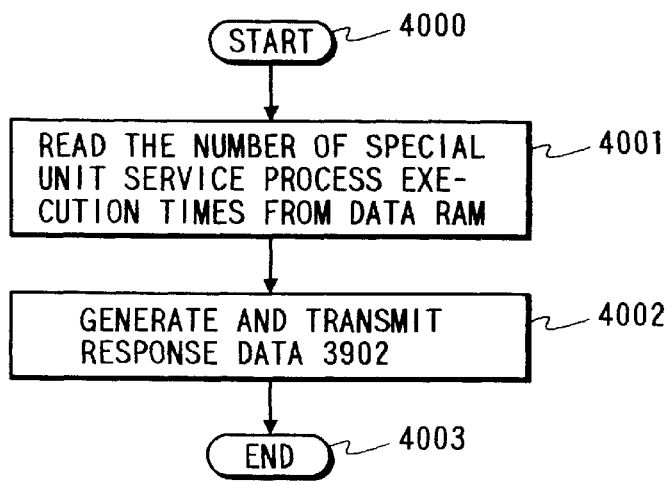
FIG. 40 is a flow chart showing a process performed by the CPU unit in response to a request for reading the number of special unit service process execution times issued from the external peripheral device in Embodiment 7 of the invention.

On the other hand, the CPU unit 1A receives the request data 3901 in the communication process 2031 with the external peripheral device shown in FIG. 2. At the process 301 shown in FIG. 3, the process operation is branched to a special unit service process time reading process 311 in response to the request code 3901. At a process 311, a process operation 4000 shown in FIG. 40 is executed. In this process 4000, the measurement result is read from the special unit service process time area 5052 of the data RAM 13A of FIG. 5. At a process 4002, response data 3902 shown in FIG. 39 is formed from the read measurement result, and the formed response data 3902 is transmitted to the external peripheral device 2A of FIG. 1. Then, the process operation is ended at a step 4003. When the measured execution number of the special unit service process is 5, a value of 5 is transmitted as the special unit service process execution number 39021 of the response data 3902. On the other hand, the external peripheral device 2A of FIG. 2 which has received this response data 3902 displays the special unit service process execution number 39021 of the response data 3902 on the special unit service process execution number area 3602 of the screen as shown in FIG. 36. Thus, the user can recognize the measurement result of the special unit service process time from the screen of the external peripheral device 2A.

As described above, in accordance with Embodiment 7 of the present invention, the process operation for measuring the execution number of the special unit service process is previously prepared and stored into the system ROM 12A of the CPU 1A. Accordingly, the user can measure the execution number of the special unit service process which could not be conventionally measured.

EMBODIMENT 8

Next, a method for measuring the initiation interval time of the interrupt program, as one example of the internal conditions of the CPU unit 1A will now be explained with reference to FIGS. 1 to 3, FIG. 5, FIG. 29, and FIGS. 41 to 42.

First, the CPU unit 1A starts the main program execution process 201 of FIG. 2. At a process 2011, the present value of the internal timer 21A is stored in the interrupt program starting time area 5031 of the data RAM 13A of FIG. 5. Then, the process operation is advanced to a step 202 at which the sequence process is performed. Then, when the interrupt signal is sent from the interrupt producing circuit 17 of FIG. 1 while executing the sequence process 202, the CPU 10 interrupts the execution of the sequence process 202 of FIG. 2, and executes the interrupt program execution process 204. At the process 204, the value stored in the interrupt program starting time area of the data RAM 13A of FIG. 5 is subtracted from the present value of the internal timer 21A. The subtraction result is stored into the interrupt program initiation interval time area 508 of the data RAM 13A. At the next process 2043, the present value of the internal timer 21A is stored into the interrupt program starting time area 5031 of FIG. 5.

With the above-described process operations, such an interrupt program initiation interval time after the interrupt program 204 is executed until the interrupt program 204 is executed can be measured.

Figure 41:
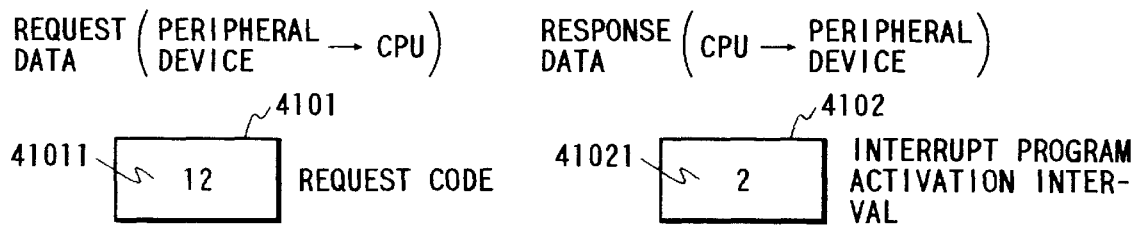
FIG. 41 illustrates a structure of data exchanged between the external peripheral device and the CPU unit in Embodiment 8 of the invention.

Next, the user may read the measurement result of the initiation interval time of the interrupt program measured by the CPU unit 1A. Similar to Embodiment 3, the user instructs the external peripheral device 2A to monitor the interrupt program initiation interval time from the keyboard 2a of the external peripheral device 2A of FIG. 2 so as to read out this measurement result. Accordingly, the external peripheral device 2A transmits the request data 4101 for reading the interrupt program initiation interval time to the CPU unit 1A. Now, FIG. 41 shows a structure of data communicated with the CPU unit 1A in order that the external peripheral device 2A reads out the measurement result of the interrupt program initiation interval time measured by the CPU unit 1A. Reference numeral 4101 shows a structure of request data sent from the external peripheral device 2A to the CPU unit 1A. Reference numeral 41011 is a request code for instructing the readout of the interrupt program initiation interval time. Reference numeral 4102 is a structure of response data sent from the CPU unit 1A to the external peripheral device 2A in response to the request data 4101. Reference numeral 41021 denotes the measurement result of the interrupt program initiation interval time.

Figure 42:
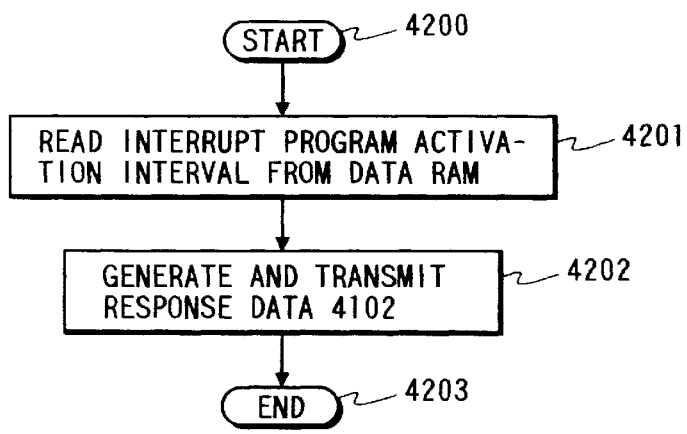
FIG. 42 is a flow chart showing a process performed by the CPU unit in response to an interrupt program activation interval reading request from the external peripheral device in Embodiment 8 of the invention.

On the other hand, the CPU unit 1A receives the request data 4101 in the communication process 2031 with the external peripheral device shown in FIG. 2. At the process 301 shown in FIG. 3, the process operation is branched to a special unit service process time reading process 312 in response to the request code 41011. At a process 312, a process operation 4200 shown in FIG. 42 is executed. In this process 4200, the measurement result is read from the interrupt program initiation interval time area 508 of the data RAM 13A of FIG. 5. At a process 4202, response data 4102 is formed from the read measurement result, and the formed response data 4102 is transmitted to the external peripheral device 2A of FIG. 2. Then, the process operation is ended at a step 4203. When the measured interrupt program initiation interval time is for instance 2 msec, a value of 2 is transmitted as the interrupt program initiation interval time 41021 of the response data 4102. On the other hand, the external peripheral device 2A of FIG. 2 which has received this response data 4102 displays the interrupt program initiation interval time 41021 of the response data 4102 on the interrupt program initiation interval time display area 2903 of the screen as shown in FIG. 29. Thus, the user can recognize the measurement result of the interrupt program initiation interval time from the screen of the external peripheral device 2A.

As described above, in accordance with Embodiment 8 of the present invention, the process operation for measuring the interrupt program initiation interval time is previously prepared and stored into the system ROM 12A of the CPU 1A. Accordingly, the user need not add such a sequence program for measuring the interrupt program initiation interval time, but can quickly measure the interrupt program initiation interval time.

EMBODIMENT 9

Next, a method for measuring the execution interval time of the special unit service process, as one example of the internal conditions of the CPU unit 1A will now be explained with reference to FIGS. 1 to 3, FIG. 5, FIG. 36, and FIGS. 43 to 44.

First, the execution interval time of the special unit service process 2032 of FIG. 2 is measured by the CPU unit 1A of FIG. 1. This measurement method may be realized by employing a similar manner as one employed to measure the interrupt program execution interval time shown in Embodiment 8. That is, the CPU unit 1A executes the main program execution process 201 of FIG. 2. At a process 2012, the present value of the internal timer 21A is stored into the special unit service process execution starting area 5051 of the data RAM 13A of FIG. 5. Next, in the special unit service process 2032 of FIG. 2, a process 3300 shown in FIG. 33 is executed. In this process 3300, a check is done at a process 3301 as to whether or not the processing request is issued from the special unit. When the processing request is issued, at the next process 3303, the value stored in the special unit service process starting time area 5051 of FIG. 5 is subtracted from the present value of the internal timer 21A of FIG. 1. The subtraction result is stored in the special unit service process execution interval time area 509 of FIG. 5. At the next process 3304, the present value of the internal timer 21A of FIG. 1 is stored into the special unit service process starting time area 5051 of FIG. 5. Then, at a process 3305, a service actual process 3305 is executed in response to the processing request issued from the special function unit 5 of FIG. 1.

With the above process operations, such special unit service process execution interval time can be measured which is defined after the actual special unit service process 3305 of FIG. 33 is executed, and until the actual special unit service process 3305 is subsequently performed.

Figure 43:
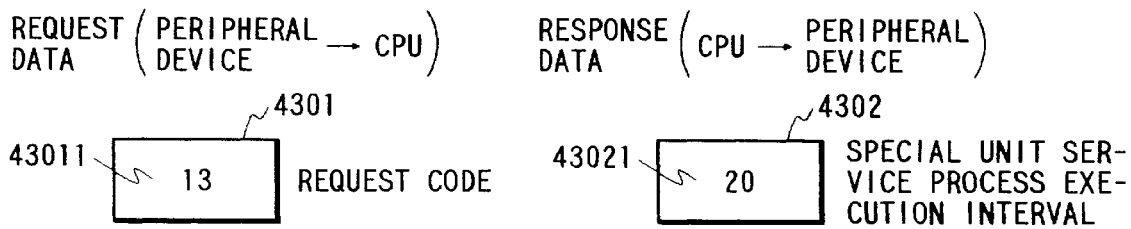
FIG. 43 illustrates a structure of data exchanged between the external peripheral device and the CPU unit in Embodiment 9 of the invention.
Figure 45:
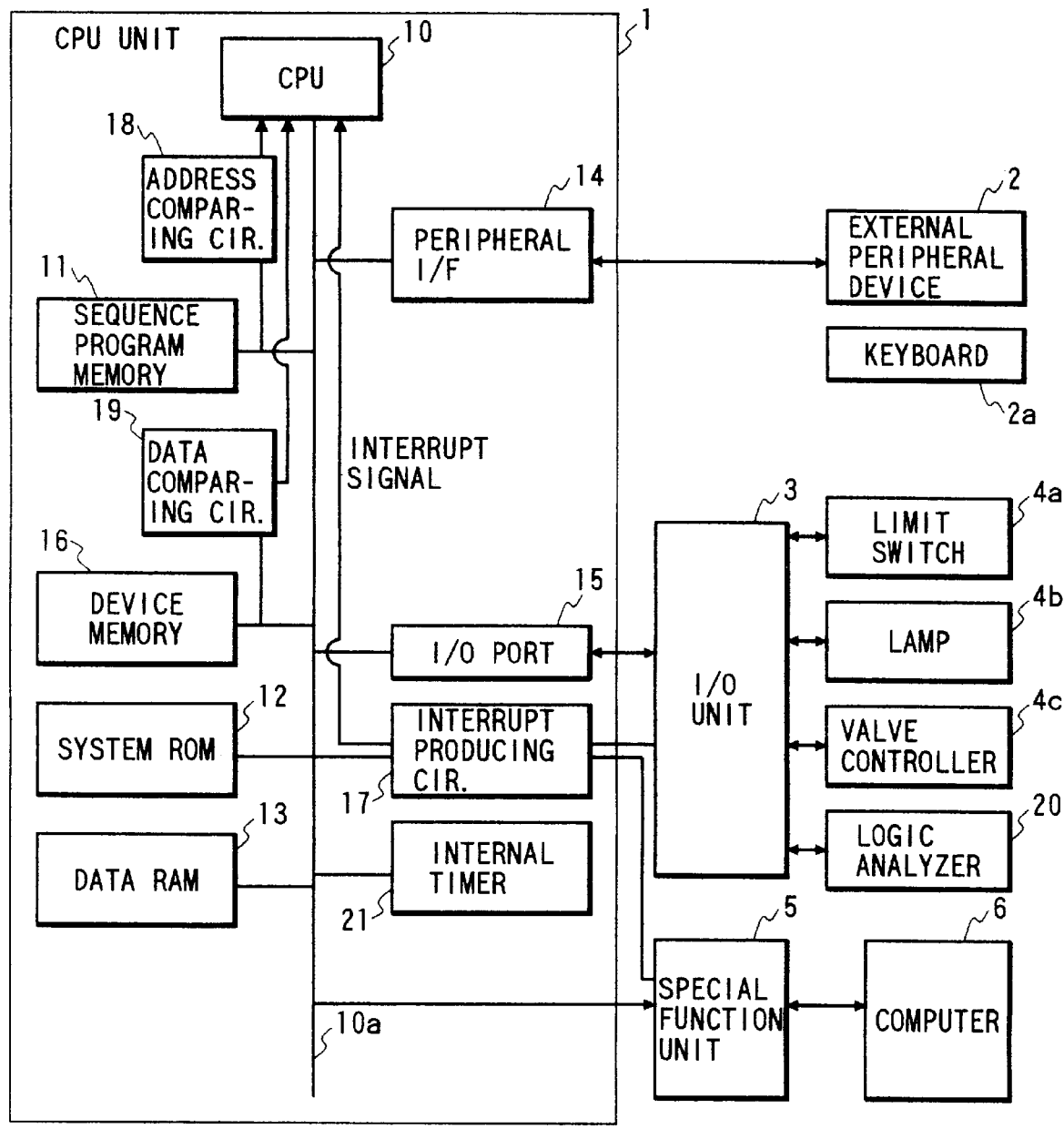
FIG. 45 is a block diagram showing a configuration of a conventional PC.

Next, the user may read the above-described execution interval time of the special unit service process measured by the CPU unit 1A. Similar to Embodiment 3, the user instructs the external peripheral device 2A to monitor the special unit service process execution interval time from the keyboard 2a of the external peripheral device 2A of FIG. 2 so as to read out this measurement result. Accordingly, the external peripheral device 2A transmits the request data 4301 shown in FIG. 43 for reading the special unit service process execution interval time to the CPU unit 1A. Now, FIG. 43 shows a structure of data communicated with the CPU unit 1A in order that the external peripheral device 2A reads out the measurement result of the special unit service process execution interval time from the CPU unit 1A. Reference numeral 4101 shows a structure of request data sent from the external peripheral device 2A to the CPU unit 1A. Reference numeral 41011 is a request code for instructing the readout of the special unit service process execution interval time. Reference numeral 4102 is a structure of response data sent from the CPU unit 1A to the external peripheral device 2A in response to the request data 4101. Reference numeral 41021 denotes the measurement result of the special unit service process execution interval time.

On the other hand, the CPU unit 1A receives the request data 4301 in the communication process 2031 with the external peripheral device shown in FIG. 2. At the process 301 shown in FIG. 3, the process operation is branched to a special unit service process time reading process 313 in response to the request code 43011. At a process 313, a process operation 4400 shown in FIG. 44 is executed. In this process 4400, the measurement result is read from the special unit service process execution interval time area 509 of the data RAM 13A of FIG. 5. At a process 4402, response data 4302 is formed from the read measurement result, and the formed response data 4302 is transmitted to the external peripheral device 2A of FIG. 2. Then, the process operation is ended at a step 4403. When the measured special unit service process initiation interval time is for instance 20 msec, a value of 20 is transmitted as the special unit service process initiation interval time 43031 of the response data 4302. On the other hand, the external peripheral device 2A of FIG. 2 which has received this response data 4302 displays the initiation interval time 43021 of the response data 4302 on the initiation interval time display area 3603 of the screen as shown in FIG. 36. Thus, the user can recognize the measurement result of the special unit service process execution interval time from the screen of the external peripheral device 2A.

As described above, in accordance with Embodiment 9 of the present invention, the process operation for measuring the special unit service process initiation interval time is previously prepared and stored into the system ROM 12A of the CPU 1A. Accordingly, the user need not add the sequence program for measuring such initiation interval time of the special unit service process 2032, and also can correctly measure it rather than the conventional sequence program. The user can quickly and correctly measure the initiation interval time of the special unit service process 2032.

While the embodiment of the present invention has been described, other methods may be realized by applying the above-described method of this embodiment. For instance, the process time of the communication process 2031 with the external peripheral device 2A of FIG. 2 may be measured. A detailed concrete means to achieve this measurement is substantially identical to that of the above-described embodiment, so that this explanation is omitted.

Although in the embodiment of the present invention, the area for storing the data about the internal operation conditions of the CPU unit 1A is reserved in the data RAM 13A of FIG. 1, the data storage area may be reserved in, for example, the device memory 16 of FIG. 1. As a result, the internal operation conditions of the CPU unit 1A may be handled as the word device from the sequence program.

It should be noted that the external peripheral device 2A of FIG. 1 may merely include the means for communicating with the CPU unit 1A, the means for displaying the internal operation conditions of the CPU unit 1A, and the means for inputting the instruction of the user as the keyboard 2a. This external peripheral device may be realized from the general-purpose personal computer, and the specific device for monitoring the interval operation conditions of the CPU unit 1A.

The storage medium for storing the system program used to monitor the internal operation conditions of the CPU unit 1A, according to the present invention, is not limited to such a ROM as the system ROM 12A of FIG. 1, but may be realized by a RAM and other storage media.

As described above, according to the present invention, since the internal operation conditions of the CPU unit are stored in the data storage unit and then are monitored from the external peripheral device, the user can recognize the internal operation conditions of the CPU unit without performing such a cumbersome operation as adding, the sequence program as in prior art.

Also, the time measuring process up to the condition change of the specific device is entered into the CPU unit, so that the time measurement can be done without adding such an unnecessary sequence program which is used to activate the system. Accordingly, the capacity of the sequence program may be minimized. The time up to the condition change of the device, measured by the present invention, may constitute the major aspect for controlling such delicate timing of the system by the user.

Further, the time required to process the designated section of the sequence program can be measured by using only one address comparing circuit, and also can be displayed on the external display device. Thus, the designated section can be measured with a simpler PC, as compared with the prior art PC. The user can easily measure the time required to process the above-described designated section without forming the time measuring program and using the measuring device.

Also, the measurement process of the interrupt program accumulated execution time performed within a single scan is entered into the CPU unit, so that the measurement can be achieved without additionally providing such an unnecessary sequence program for actually operating the system. Since there is no time error caused by adding the measuring program to the main program according to the present invention, the accumulated execution time of the interrupt program can be correctly measured, as compared with the conventional measuring method. Thus, the user can correctly control the loads given between the main program and the interrupt program based on the influences with respect to the scanning time of the overall interrupt program, as compared with the conventional manner.

Also, the process to measure the time required to perform the END process is entered into the CPU unit, and then the CPU unit represents the measured result on the external display unit. Thus, the user can readily measure the time required to perform the END process without either forming the unnecessary time measuring program operated on the system or performing such a cumbersome operation to use the measuring device.

Further, the process for measuring the time required to perform the service process in response to the request from the special function unit is entered into the CPU unit, and also the measurement result made by the CPU unit is displayed on the external display unit. As a result, the user can easily measure the time required for the service process without forming the unnecessary time measuring program actually operated on the system and performing such a cumbersome operation to use the measuring device.

Moreover, the process to measure the execution number of the interrupt program is entered into the CPU unit, and the result is displayed on the external display unit. Thus, the user can perform such a measurement without forming the unnecessary execution time measuring program actually operated on the system.

The process to measure the execution number of the service process with respect to the processing request from the special function unit is entered into the CPU unit, and the result is displayed on the external display unit, so that the user can grasp the communication conditions between the PC and the special function unit. When a system failure happens to occur, the failure reasons may be easily discriminated by comparing the measured execution number of the service process with the number of transmitting the processing request from the computer connected to the special function unit.

Also, the process to measure the initiation interval time of the interrupt program is entered into the CPU unit, and the measurement result is displayed on the external peripheral device. Accordingly, the user can measure the process time without forming such an unnecessary initiation interval time measuring program actually operated on the system.

Further, the process to measure the initiation interval time of the service process in response to the processing request issued from the special function unit is entered into the CPU unit, and the measurement result is displayed on the external peripheral unit. Therefore, the user can measure the initiation interval time of the service process without forming an unnecessary measuring program actually operated on the system.

What is claimed is:

1. A programmable controller for controlling a control subject device such as an industrial apparatus based on a stored sequence program, comprising:

a CPU unit containig a CPU;

an interface having means for receiving a processing request from an external peripheral device through communication, and means for sending a processing response from the CPU unit to the external peripheral device;

a CPU disposed in the CPU unit, for executing a sequence program and control programs that cause the CPU unit to operate;

a sequence program storage unit for storing the sequence program;

a control program storage unit for storing the control programs including a control program for measuring an internal operation state of the CPU unit;

a data storage unit for storing data used in processing of the CPU; and an internal operation state storage unit for storing a measured internal operation state of the CPU unit, wherein the internal operation measuring control program enables the internal operation state of the CPU unit to be measured in response to a monitor processing request from the external peripheral device, and a measurement result to be sent to the external peripheral device, to thereby allow the external peripheral device to monitor the internal operation state of the CPU unit.

2. The programmable controller of claim 1, further comprising:

an interrupt generating circuit for monitoring a state of a designated device, and for sending an interrupt signal to the CPU at a time instant when the designated device assumes a designated state;

means for measuring an ON or OFF interval of the designated device;

time measurement storage unit for storing the measured ON or OFF interval of the designated device; and means for displaying data of the time measurement storage unit on the external peripheral appliance, whereby a time period until the designated device changes its state can be measured.

3. The programmable controller of claim 1, further comprising means for measuring a process time of a designated section of the sequence program, whereby a measurement result of the process time can be monitored by the external peripheral device.

4. The programmable controller as claimed in claim 3, further comprising means for storing said process time of the designated section of the sequence program.

5. The programmable controller of claim 1, further comprising:

means for measuring an accumulated execution time of time periods during which interrupt programs are executed in one scan of the sequence program;

an interrupt accumulation storage unit for storing the measured accumulated execution time of the interrupt programs; and means for displaying data of the interrupt accumulation storage unit on the external peripheral appliance, whereby an influence of execution times of the interrupt programs on a scan time can be measured.

6. The programmable controller of claim 1, further comprising means for measuring a process time of an END process, whereby a measurement result of the process time can be monitored by the external peripheral device.

7. The programmable controller as claimed in claim 6, further comprising means for storing said process time of the END process.

8. The programmable controller of claim 1, further comprising means for measuring a process time during which a service program is executed in response to a processing request from a special function unit, whereby a measurement result of the process time can be monitored by the external peripheral device.

9. The programmable controller as claimed in claim 8, further comprising means for storing said process time during which the service program is executed in response to the processing request from the special function unit.

10. The programmable controller of in claim 1, further comprising means for measuring number of execution times of an interrupt program activated by an external interrupt signal, whereby a measurement result of the number of execution times can be monitored by the external peripheral device.

11. The programmable controller as claimed in claim 10, further comprising means for storing said number of execution times of the interrupt program activated by the interval interrupt signal.

12. The programmable controller of claim 1, further comprising means for measuring number of execution times of a service program executed in response to a processing request from a special function unit, whereby a measurement result of the number of execution times can be monitored by the external peripheral device.

13. The programmable controller as claimed in claim 12, further comprising means for storing said number of execution times of the service program executed in response to the processing request from the special function unit.

14. The programmable controller of claim 1, further comprising means for measuring an activation interval of an interrupt program that is activated in response to an external interrupt signal, whereby a measurement result of the activation interval can be monitored by the external peripheral device.

15. The programmable controller as claimed in claim 14, further comprising means for storing said activation interval of the interrupt program.

16. The programmable controller of claim 1, further comprising means for measuring an interval between various processing requests from the external peripheral device and a special function unit, whereby a measurement result of the interval can be monitored by the external peripheral device.

17. The programmable controller as claimed in claim 16, further comprising means for storing said interval between various processing requests from the external peripheral device and the special function unit.

18. The programmable controller as claimed in claim 1, wherein said control program storage unit is a Read Only Memory.

* * * * *